(12) United States Patent
Mignard

(10) Patent No.: US 8,004,743 B2
(45) Date of Patent: Aug. 23, 2011

(54) METHOD AND APPARATUS FOR PROVIDING BRIGHTNESS CONTROL IN AN INTERFEROMETRIC MODULATOR (IMOD) DISPLAY

(75) Inventor: Marc Mignard, Berkeley, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 0 days.

(21) Appl. No.: 11/408,753

(22) Filed: Apr. 21, 2006

(65) Prior Publication Data

US 2007/0247704 A1   Oct. 25, 2007

(51) Int. Cl.
*G02B 26/00* (2006.01)
(52) U.S. Cl. .................. 359/295; 359/265; 359/245
(58) Field of Classification Search .......... 359/365, 359/295, 265
See application file for complete search history.

(56) References Cited

U.S. PATENT DOCUMENTS

| | | | |
|---|---|---|---|
| 2,677,714 A | 5/1954 | Max | |
| 3,247,392 A | 4/1966 | Thelen | |
| 3,443,854 A | 5/1969 | Weiss | |
| 3,448,334 A | 6/1969 | Frost | |
| 3,653,741 A | 4/1972 | Marks | |
| 3,679,313 A | 7/1972 | Rosenberg | |
| 3,725,868 A | 4/1973 | Malmer, Jr. et al. | |
| 4,200,472 A | 4/1980 | Chappell | |
| 4,377,324 A | 3/1983 | Durand et al. | |
| 4,389,096 A | 6/1983 | Hori et al. | |
| 4,400,577 A | 8/1983 | Spear | |
| 4,441,789 A | 4/1984 | Pohlack | |
| 4,441,791 A | 4/1984 | Hornbeck | |
| 4,633,031 A | 12/1986 | Todorof | |
| 4,790,635 A | 12/1988 | Apsley | |
| 4,859,060 A | 8/1989 | Katagari et al. | |
| 4,878,741 A | 11/1989 | Fergason | |
| 4,929,061 A | 5/1990 | Tominaga et al. | |
| 4,980,775 A | 12/1990 | Brody | |
| 4,982,184 A | 1/1991 | Kirkwood | |
| 5,022,745 A | 6/1991 | Zahowski et al. | |
| 5,044,736 A | 9/1991 | Jaskie et al. | |
| 5,136,669 A | 8/1992 | Gerdt | |
| 5,142,414 A | 8/1992 | Koehler | |

(Continued)

FOREIGN PATENT DOCUMENTS

CN    1409157 A    4/2003
(Continued)

OTHER PUBLICATIONS

ISR and WO for PCT/US07/08790 filed Apr. 10, 2007.
(Continued)

*Primary Examiner* — Jessica T Stultz
(74) *Attorney, Agent, or Firm* — Knobbe Martens Olson & Bear LLP

(57) ABSTRACT

Methods and systems for providing brightness control in an interferometric modulator (IMOD) display are provided. In one embodiment, an interferometric modulator display pixel is provided that includes a microelectromechanical systems (MEMS) interferometric modulator having an associated first color spectrum, and a color absorber located substantially in front of the interferometric modulator display pixel, in which the color absorber has an associated second color spectrum. The microelectromechanical systems (MEMS) interferometric modulator is operable to shift the first color spectrum relative to the second color spectrum to control a visual brightness of the interferometric modulator display pixel independent of a color of the interferometric modulator display pixel.

61 Claims, 14 Drawing Sheets

U.S. PATENT DOCUMENTS

| | | |
|---|---|---|
| 5,168,406 A | 12/1992 | Nelson |
| 5,192,946 A | 3/1993 | Thompson et al. |
| 5,233,385 A | 8/1993 | Sampsell |
| 5,287,215 A | 2/1994 | Warde et al. |
| 5,293,272 A | 3/1994 | Jannson et al. |
| 5,311,360 A | 5/1994 | Bloom et al. |
| 5,345,322 A | 9/1994 | Fergason et al. |
| 5,356,488 A | 10/1994 | Hezel |
| 5,365,283 A | 11/1994 | Doherty et al. |
| 5,398,170 A | 3/1995 | Lee |
| 5,401,983 A | 3/1995 | Jokerst et al. |
| 5,448,314 A | 9/1995 | Heimbuch et al. |
| 5,452,024 A | 9/1995 | Sampsell |
| 5,517,347 A | 5/1996 | Sampsell |
| 5,550,373 A | 8/1996 | Cole et al. |
| 5,589,852 A | 12/1996 | Thompson et al. |
| 5,619,059 A | 4/1997 | Li et al. |
| 5,619,365 A | 4/1997 | Rhoades et al. |
| 5,619,366 A | 4/1997 | Rhoads et al. |
| 5,633,739 A | 5/1997 | Matsuyama |
| 5,638,084 A | 6/1997 | Kalt |
| 5,710,656 A | 1/1998 | Goossen |
| 5,737,115 A | 4/1998 | Mackinlay et al. |
| 5,739,945 A | 4/1998 | Tayebati |
| 5,745,281 A | 4/1998 | Yi et al. |
| 5,754,260 A | 5/1998 | Ooi |
| 5,771,321 A | 6/1998 | Stern |
| 5,782,995 A | 7/1998 | Nanya et al. |
| 5,805,117 A | 9/1998 | Mazurek |
| 5,815,229 A | 9/1998 | Shapiro et al. |
| 5,835,255 A | 11/1998 | Miles |
| 5,853,310 A | 12/1998 | Nishimura |
| 5,868,480 A | 2/1999 | Zeinali |
| 5,886,688 A | 3/1999 | Fifield |
| 5,892,598 A | 4/1999 | Asakawa et al. |
| 5,914,804 A | 6/1999 | Goosen et al. |
| 5,933,183 A | 8/1999 | Enomoto et al. |
| 5,959,763 A | 9/1999 | Bozler et al. |
| 5,986,796 A | 11/1999 | Miles et al. |
| 5,991,073 A | 11/1999 | Woodgate |
| 6,028,690 A | 2/2000 | Carter et al. |
| 6,031,653 A | 2/2000 | Wang et al. |
| 6,040,937 A | 3/2000 | Miles |
| 6,046,840 A | 4/2000 | Huibers |
| 6,055,090 A * | 4/2000 | Miles ..................... 359/291 |
| 6,057,878 A | 5/2000 | Ogiwara |
| 6,088,102 A | 7/2000 | Manhart |
| 6,113,239 A | 9/2000 | Sampsell et al. |
| 6,147,728 A | 11/2000 | Okumura |
| 6,195,196 B1 | 2/2001 | Kimura et al. |
| 6,201,633 B1 | 3/2001 | Peeters et al. |
| 6,213,615 B1 | 4/2001 | Siitari |
| 6,243,149 B1 | 6/2001 | Swanson et al. |
| 6,282,010 B1 | 8/2001 | Sulzbach |
| 6,285,424 B1 | 9/2001 | Yoshida |
| 6,288,824 B1 | 9/2001 | Kastalsky |
| 6,300,558 B1 | 10/2001 | Takamoto |
| 6,301,000 B1 | 10/2001 | Johnson |
| 6,323,834 B1 | 11/2001 | Colgan et al. |
| 6,342,970 B1 | 1/2002 | Sperger et al. |
| 6,356,378 B1 | 3/2002 | Huibers |
| 6,381,022 B1 | 4/2002 | Zavracky et al. |
| 6,400,738 B1 | 6/2002 | Tucker |
| 6,466,358 B2 | 10/2002 | Tew |
| 6,483,613 B1 | 11/2002 | Woodgate et al. |
| 6,522,794 B1 | 2/2003 | Bischel et al. |
| 6,549,338 B1 | 4/2003 | Wolverton et al. |
| 6,570,584 B1 | 5/2003 | Cok et al. |
| 6,574,033 B1 | 6/2003 | Chui |
| 6,597,419 B1 | 7/2003 | Okada et al. |
| 6,597,490 B2 | 7/2003 | Tayebati |
| 6,636,322 B1 | 10/2003 | Terashita |
| 6,643,069 B2 | 11/2003 | Dewald |
| 6,650,455 B2 | 11/2003 | Miles |
| 6,657,611 B1 | 12/2003 | Sterken |
| 6,674,562 B1 | 1/2004 | Miles |
| 6,680,792 B2 | 1/2004 | Miles |
| 6,738,194 B1 | 5/2004 | Ramirez et al. |
| 6,747,785 B2 | 6/2004 | Chen et al. |
| 6,760,146 B2 | 7/2004 | Ikeda et al. |
| 6,768,555 B2 | 7/2004 | Chen et al. |
| 6,773,126 B1 | 8/2004 | Hatjasalo et al. |
| 6,798,469 B2 | 9/2004 | Kimura |
| 6,806,924 B2 | 10/2004 | Niiyama |
| 6,811,267 B1 | 11/2004 | Allen et al. |
| 6,822,780 B1 | 11/2004 | Long |
| 6,825,969 B2 | 11/2004 | Chen et al. |
| 6,841,787 B2 | 1/2005 | Almogy |
| 6,862,029 B1 | 3/2005 | D'Souza et al. |
| 6,867,896 B2 | 3/2005 | Miles |
| 6,870,581 B2 | 3/2005 | Li et al. |
| 6,880,959 B2 | 4/2005 | Houston |
| 6,882,458 B2 | 4/2005 | Lin et al. |
| 6,912,022 B2 | 6/2005 | Lin et al. |
| 6,930,816 B2 * | 8/2005 | Mochizuki ..................... 359/291 |
| 6,967,779 B2 | 11/2005 | Fadel |
| 6,982,820 B2 | 1/2006 | Tsai |
| 6,995,890 B2 | 2/2006 | Lin et al. |
| 6,999,225 B2 | 2/2006 | Lin et al. |
| 6,999,236 B2 | 2/2006 | Lin et al. |
| 7,002,726 B2 | 2/2006 | Patel |
| 7,006,272 B2 | 2/2006 | Tsai |
| 7,009,754 B2 | 3/2006 | Huibers |
| 7,016,095 B2 | 3/2006 | Lin |
| 7,025,464 B2 | 4/2006 | Beeson et al. |
| 7,034,981 B2 * | 4/2006 | Makigaki ..................... 359/290 |
| 7,038,752 B2 | 5/2006 | Lin |
| 7,042,643 B2 | 5/2006 | Miles |
| 7,072,093 B2 * | 7/2006 | Piehl et al. ..................... 359/290 |
| 7,072,096 B2 | 7/2006 | Holman et al. |
| 7,110,158 B2 | 9/2006 | Miles |
| 7,113,339 B2 | 9/2006 | Taguchi |
| 7,123,216 B1 | 10/2006 | Miles |
| 7,126,738 B2 | 10/2006 | Miles |
| 7,138,984 B1 | 11/2006 | Miles |
| 7,142,347 B2 | 11/2006 | Islam |
| 7,161,728 B2 | 1/2007 | Sampsell et al. |
| 7,161,730 B2 | 1/2007 | Floyd et al. |
| 7,172,915 B2 | 2/2007 | Lin et al. |
| 7,176,861 B2 | 2/2007 | Dedene et al. |
| 7,187,489 B2 | 3/2007 | Miles |
| 7,198,973 B2 | 4/2007 | Lin et al. |
| 7,218,429 B2 | 5/2007 | Batchko |
| 7,271,790 B2 | 9/2007 | Hudson et al. |
| 7,304,784 B2 | 12/2007 | Chui |
| 7,342,705 B2 | 3/2008 | Chui |
| 7,342,709 B2 | 3/2008 | Lin |
| 7,372,449 B2 | 5/2008 | Kodama et al. |
| 7,385,748 B2 | 6/2008 | Miles |
| 7,483,197 B2 | 1/2009 | Miles |
| 7,489,428 B2 | 2/2009 | Sampsell |
| 7,525,730 B2 | 4/2009 | Floyd |
| 7,595,811 B2 | 9/2009 | Matsuda |
| 7,603,001 B2 | 10/2009 | Wang |
| 7,660,028 B2 | 2/2010 | Lan |
| 7,701,029 B2 | 4/2010 | Mabuchi |
| 7,710,632 B2 | 5/2010 | Cummings |
| 7,719,500 B2 | 5/2010 | Chui |
| 7,807,488 B2 | 10/2010 | Gally |
| 7,855,824 B2 | 12/2010 | Gally |
| 7,898,521 B2 | 3/2011 | Gally |
| 2001/0049061 A1 | 12/2001 | Nakagaki et al. |
| 2002/0006044 A1 | 1/2002 | Harbers |
| 2002/0015215 A1 * | 2/2002 | Miles ..................... 359/290 |
| 2002/0050286 A1 | 5/2002 | Kubota |
| 2002/0544244 | 5/2002 | Miles |
| 2002/0075555 A1 | 6/2002 | Miles |
| 2002/0080465 A1 | 6/2002 | Han |
| 2002/0126364 A1 | 9/2002 | Miles |
| 2002/0149584 A1 | 10/2002 | Simpson |
| 2002/0154215 A1 | 10/2002 | Schechterman |
| 2002/0191130 A1 | 12/2002 | Liang et al. |
| 2003/0006730 A1 | 1/2003 | Tachibana |
| 2003/0011864 A1 | 1/2003 | Flanders |
| 2003/0043157 A1 | 3/2003 | Miles |
| 2003/0072070 A1 | 4/2003 | Miles |
| 2003/0083429 A1 | 5/2003 | Smith |

| | | |
|---|---|---|
| 2003/0107692 A1 | 6/2003 | Sekiguchi |
| 2003/0151821 A1 | 8/2003 | Favalora et al. |
| 2003/0160919 A1 | 8/2003 | Yutaka et al. |
| 2003/0161040 A1 | 8/2003 | Ishii |
| 2003/0169385 A1 | 9/2003 | Okuwaki |
| 2003/0179383 A1 | 9/2003 | Chen et al. |
| 2003/0206281 A1 | 11/2003 | Jain |
| 2003/0210363 A1 | 11/2003 | Yasukawa et al. |
| 2003/0213514 A1 | 11/2003 | Ortabasi |
| 2003/0214621 A1 | 11/2003 | Kim et al. |
| 2004/0017599 A1 | 1/2004 | Yang |
| 2004/0027315 A1 | 2/2004 | Senda et al. |
| 2004/0051929 A1 | 3/2004 | Sampsell et al. |
| 2004/0066477 A1 | 4/2004 | Morimoto et al. |
| 2004/0070711 A1 | 4/2004 | Wen et al. |
| 2004/0080807 A1 | 4/2004 | Chen et al. |
| 2004/0080938 A1 | 4/2004 | Holman |
| 2004/0100594 A1 | 5/2004 | Huibers |
| 2004/0114242 A1 | 6/2004 | Sharp |
| 2004/0115339 A1 | 6/2004 | Ito |
| 2004/0125048 A1 | 7/2004 | Toshihiro et al. |
| 2004/0125281 A1 | 7/2004 | Lin et al. |
| 2004/0125282 A1 | 7/2004 | Lin et al. |
| 2004/0174583 A1 | 9/2004 | Chen et al. |
| 2004/0188599 A1 | 9/2004 | Viktorovitch et al. |
| 2004/0209195 A1 | 10/2004 | Lin |
| 2004/0217919 A1 | 11/2004 | Piehl et al. |
| 2004/0218251 A1 | 11/2004 | Piehl et al. |
| 2004/0233503 A1 | 11/2004 | Kimura |
| 2004/0240032 A1 | 12/2004 | Miles |
| 2005/0002082 A1 | 1/2005 | Miles |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0042117 A1 | 2/2005 | Lin |
| 2005/0057442 A1 | 3/2005 | Way |
| 2005/0069209 A1 | 3/2005 | Damera-Venkata et al. |
| 2005/0083352 A1 | 4/2005 | Higgins |
| 2005/0117623 A1 | 6/2005 | Shchukin |
| 2005/0120553 A1 | 6/2005 | Brown |
| 2005/0179977 A1 | 8/2005 | Chui et al. |
| 2005/0195462 A1 | 9/2005 | Lin |
| 2005/0212738 A1 | 9/2005 | Gally |
| 2005/0286113 A1 | 12/2005 | Miles |
| 2006/0001942 A1 | 1/2006 | Chui |
| 2006/0022966 A1 | 2/2006 | Mar |
| 2006/0028708 A1 | 2/2006 | Miles |
| 2006/0065940 A1 | 3/2006 | Kothari |
| 2006/0066541 A1 | 3/2006 | Gally et al. |
| 2006/0066557 A1 | 3/2006 | Floyd |
| 2006/0066641 A1 | 3/2006 | Cummings et al. |
| 2006/0066935 A1 | 3/2006 | Cummings et al. |
| 2006/0067600 A1 | 3/2006 | Gally et al. |
| 2006/0067633 A1 | 3/2006 | Gally et al. |
| 2006/0067651 A1 | 3/2006 | Chui |
| 2006/0077122 A1 | 4/2006 | Gally et al. |
| 2006/0077124 A1 | 4/2006 | Gally et al. |
| 2006/0077125 A1 | 4/2006 | Floyd |
| 2006/0077127 A1* | 4/2006 | Sampsell et al. ............. 345/55 |
| 2006/0077148 A1 | 4/2006 | Gally et al. |
| 2006/0077149 A1 | 4/2006 | Gally et al. |
| 2006/0077512 A1 | 4/2006 | Cummings |
| 2006/0103912 A1* | 5/2006 | Katoh et al. ............. 359/290 |
| 2006/0130889 A1 | 6/2006 | Li et al. |
| 2006/0180886 A1 | 8/2006 | Tsang |
| 2006/0201546 A1 | 9/2006 | Yokoyama |
| 2006/0250337 A1 | 11/2006 | Miles |
| 2006/0274243 A1 | 12/2006 | Iijima et al. |
| 2006/0274400 A1 | 12/2006 | Miles |
| 2006/0286381 A1 | 12/2006 | Naito |
| 2007/0031097 A1 | 2/2007 | Heikenfeld |
| 2007/0064446 A1 | 3/2007 | Sharma et al. |
| 2007/0113887 A1 | 5/2007 | Laih |
| 2007/0115415 A1 | 5/2007 | Piehl |
| 2007/0132843 A1 | 6/2007 | Miles |
| 2007/0206267 A1 | 9/2007 | Tung |
| 2007/0235072 A1 | 10/2007 | Bermel |
| 2007/0253054 A1 | 11/2007 | Miles |
| 2008/0112031 A1 | 5/2008 | Gally |
| 2008/0112039 A1 | 5/2008 | Chui |
| 2008/0151347 A1 | 6/2008 | Chui |
| 2008/0288225 A1 | 11/2008 | Djordjev |
| 2009/0073540 A1 | 3/2009 | Kothari |
| 2009/0086301 A1 | 4/2009 | Gally |
| 2009/0101192 A1 | 4/2009 | Kothari |
| 2009/0151771 A1 | 6/2009 | Kothari |
| 2009/0231524 A1 | 9/2009 | Tanaka |
| 2009/0242024 A1 | 10/2009 | Kothari |
| 2009/0293955 A1 | 12/2009 | Kothari |
| 2009/0296191 A1 | 12/2009 | Floyd |
| 2010/0096006 A1 | 4/2010 | Griffiths |
| 2010/0096011 A1 | 4/2010 | Griffiths |
| 2010/0214642 A1 | 8/2010 | Miles |
| 2010/0245370 A1 | 9/2010 | Narayanan |
| 2010/0245975 A1 | 9/2010 | Cummings |

FOREIGN PATENT DOCUMENTS

| | | |
|---|---|---|
| CN | 1517743 | 8/2004 |
| DE | 196 22 748 | 12/1997 |
| DE | 103 29 917 A1 | 2/2005 |
| EP | 0 223 136 A | 5/1987 |
| EP | 0 330 361 | 8/1989 |
| EP | 0 366 117 | 5/1990 |
| EP | 0 389 031 | 9/1990 |
| EP | 0 667 548 | 8/1995 |
| EP | 0 695 959 | 2/1996 |
| EP | 0 786 911 | 7/1997 |
| EP | 0 822 441 | 2/1998 |
| EP | 0 830 032 | 3/1998 |
| EP | 0 855 745 | 7/1998 |
| EP | 1 003 062 | 5/2000 |
| EP | 1 014 161 | 6/2000 |
| EP | 1 251 454 | 4/2002 |
| EP | 1 205 782 | 5/2002 |
| EP | 1 298 635 | 4/2003 |
| EP | 1 336 876 | 8/2003 |
| EP | 1 341 025 | 9/2003 |
| EP | 1 389 775 | 2/2004 |
| EP | 1 413 543 | 4/2004 |
| EP | 1 640 313 | 3/2006 |
| EP | 1 640 767 | 3/2006 |
| EP | 1 640 779 | 3/2006 |
| EP | 1 670 065 A | 6/2006 |
| EP | 1 767 981 | 3/2007 |
| EP | 2 051 124 A | 4/2009 |
| EP | 2 256 537 | 12/2010 |
| FR | 2 760 559 | 9/1998 |
| FR | 2760559 | 9/1998 |
| GB | 2 278 222 | 11/1994 |
| GB | 2 315 356 | 1/1998 |
| GB | 2321532 | 7/1998 |
| JP | 02-068513 | 3/1990 |
| JP | 02-151079 A | 6/1990 |
| JP | 04-081816 | 3/1992 |
| JP | 04-238321 A | 8/1992 |
| JP | 05-281479 | 10/1993 |
| JP | 08 18990 | 1/1996 |
| JP | 08018990 A | 1/1996 |
| JP | 09 189869 | 7/1997 |
| JP | 09-189910 | 7/1997 |
| JP | 09 281917 | 10/1997 |
| JP | 10 500224 | 1/1998 |
| JP | 10 319877 | 12/1998 |
| JP | 11 002712 | 1/1999 |
| JP | 11 174234 | 7/1999 |
| JP | 11-211999 | 8/1999 |
| JP | 11 211999 | 8/1999 |
| JP | 11-295726 A | 10/1999 |
| JP | 2000 500245 | 1/2000 |
| JP | 2002-149116 | 5/2000 |
| JP | 2000 514568 | 10/2000 |
| JP | 2001/343514 A | 12/2001 |
| JP | 2001-345458 | 12/2001 |
| JP | 2002 062505 | 2/2002 |
| JP | 2002-062505 | 2/2002 |
| JP | 2002-174780 | 6/2002 |
| JP | 2002-229023 | 8/2002 |
| JP | 2002-287047 | 10/2002 |

| | | |
|---|---|---|
| JP | 2003-021821 A | 1/2003 |
| JP | 2003 255324 | 9/2003 |
| JP | 2003 255379 | 9/2003 |
| JP | 2003 295160 | 10/2003 |
| JP | 2003-315732 | 11/2003 |
| JP | 2004-111278 | 4/2004 |
| JP | 2004-117815 | 4/2004 |
| JP | 2004-206049 | 7/2004 |
| JP | 2004-212673 | 7/2004 |
| JP | 2004 212922 | 7/2004 |
| JP | 2004-534280 A | 11/2004 |
| JP | 2005-527861 | 9/2005 |
| JP | 2005-308871 | 11/2005 |
| JP | 2008-224930 | 9/2008 |
| KR | 2002 010322 | 2/2002 |
| KR | 2003-0081662 A | 10/2003 |
| TW | 594155 | 6/2004 |
| WO | WO 95/30924 | 11/1995 |
| WO | WO 96/08833 | 3/1996 |
| WO | WO 97/17628 | 5/1997 |
| WO | WO 97/44707 A | 11/1997 |
| WO | WO 97/46908 | 12/1997 |
| WO | WO 99/52006 A2 | 10/1999 |
| WO | WO 99/67680 | 12/1999 |
| WO | WO 01/81994 | 11/2001 |
| WO | WO 02/24570 | 3/2002 |
| WO | WO 02/071132 A2 | 9/2002 |
| WO | WO 03/007049 | 1/2003 |
| WO | WO 03/056876 | 7/2003 |
| WO | WO 03/073151 | 9/2003 |
| WO | WO 03/100756 | 12/2003 |
| WO | WO 2004/006003 | 1/2004 |
| WO | WO 2004/068460 | 8/2004 |
| WO | WO 2006/036519 | 4/2006 |
| WO | WO 2006/036524 | 4/2006 |
| WO | WO 2006/036540 | 4/2006 |
| WO | WO 2007/127046 | 11/2007 |
| WO | WO 2007/142978 A2 | 12/2007 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Conner, "Hybrid Color Display Using Optical Interference Filter Array," SID Digest, pp. 577-580 (1993).
Fan et al., "Channel Drop Filters in Photonic Crystals", Optics Express, vol. 3, No. 1, 1998.
Giles et al., "Silicon MEMS Optical Switch Attenuator and Its Use in Lightwave Subsystems", IEEE Journal of Selected Topics in Quanum Electronics, vol. 5 No. 1, Jan./Feb. 1999,pp. 18-25.
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).
Huang, et al., "Multidirectional Asymmetrical Microlens-Array Light Control Films for High Performance Reflective Liquid Crystal Displays", SID Digest, 2002, pp. 870-873.
Jerman et al., "A Miniature Fabry-Perot Interferometer Fabricated Using Silicon Micromaching Techniques," IEEE Electron Devices Society (1988).
Jerman et al., "A Miniature Fabry-Perot Interferometer with a Corrugated Silicon Diaphragm Support", (1988).
Little et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-3/1996.
Mehregany et al., "MEMS Applications in Optical Systems", IEEE/LEOS 1996 Summer Topical Meetings, pp. 75-76, (Aug. 5-9, 1996).
Miles, et al., Digital Paper for reflective displays, Journal of the Society for Information Display, San Jose, CA, vol. 11, No. 1, 2003, pp. 209-215.
Miles, Interferometric Modulation: MOEMS as an enabling technology for high-performance reflective displays, Proceedings of the SPIE, 4985:28, pp. 131-139, Jan. 2003.
Miles, Mark, W., "A New Reflective FPD Technology Using Interferometric Modulation", The Proceedings of the Society for Information Display (May 11-16, 1997).
Miles, MW "A MEMS Based Interferometric Modulator (IMOD) for Display Applications" Proceedings of Sensors Expo, Oct. 21, 1997 © 1997 Helmer's Publishing, Inc., pp. 281-284.
Raley et al., "A Fabry-Perot Microinterferometer for Visible Wavelengths," IEEE Solid-State Sensor and Actuator Workshop, Hilton Head, SC, pp. 170-173 (1992).
Sperger et al., "High Performance Patterned All-Dielectric Interference Colour Filter for Display Applications", SID Digest, pp. 81-83, (1994).
Walker, et al., "Electron-beam-tunable Interference Filter Spatial Light Modulator", Optics Letters vol. 13, No. 5, pp. 345-347, (May 1988).
IPER for PCT/US2005/032773 filed on Sep. 14, 2005.
ISR and WO for PCT/US2005/032773 filed on Sep. 14, 2005.
Extended European Search Report in European Application No. EP 05255657 filed Sep. 14, 2005.
IPER for PCT/US2005/030526 filed Aug. 26, 2005.
ISR and WO for PCT/US2005/030526 filed Aug. 26, 2005.
Extended European Search Report in European Application No. EP 05255635 filed Sep. 14, 2005.
Extended European Search Report in European Application No. EP 05255636 filed Sep. 14, 2005.
ISR and WO in US/2005/032335 filed on Sep. 9, 2005.
ISR and WO in PCT/US2005/002986 filed on Feb. 2, 2005.
ISR and WO in US/2005/032633 filed on Sep. 14, 2005.
ISR and WO in US/2005/032886 filed on Sep. 14, 2005.
Extended European Search Report in European Application No. EP 05255646 filed Sep. 14, 2005.
H.A. Macleod, "Thin-Film Optical Filters", Third Edition, Institute of Physics Publishing, 2001, pp. 176-177.
International Preliminary Report on Patentability in International Application No. PCT/US2007/008790 dated Oct. 30, 2008 (International Publication No. WO 2007/127046).
Aratani K. et.al., "Surface Micromachined Tuneable Interferometer Array," Sensors and Actuators A, Elsevier Sequoia S.A., Lausanne, CH, vol. A43, No. 1/3, May 1, 1994, pp. 17-23.
"CIE Color System," cited by Examiner in U.S. Appl. No. 11/188,197, available online at http://hyperphysics.phy-astr.gsu.edu/hbase/vision/cie.html at least as of Dec. 30, 2007.
Manzardo, et. al., "Optics and Actuators for miniaturized spectrometers," International Conference on Optical MEMS, vol. 12, Issue 6, Dec. 2003.
Hohlfeld, "Micro-machined tunable optical filters with optimized band-pass spectrum;" 12th International Conference on Transducers, Solid-State Sensors, Actuators and Microsystems, vol. 2, 8-12, Jun. 8-12, 2003.
European Search Report in App. No. 06077032 dated May 25, 2007 (European Publication No. EP 1 767 981).
ISR and WO in International Application No. PCT/US05/032426 dated Jan. 11, 2006 (International Publication No. WO 2006/036524).
Austrian Search Report in U.S. Appl. No. 11/036,965 dated Jul. 25, 2005.
Austrian Search Report in U.S. Appl. No. 11/051,258 dated May 13, 2005.
Austrian Search Report in U.S. Appl. No. 11/118,110 dated Aug. 12, 2005.
Austrian Search Report in U.S. Appl. No. 11/118,605 dated Jul. 14, 2005.
Austrian Search Report in U.S. Appl. No. 11/083,841 dated Jul. 14, 2005.
Austrian Search Report in U.S. Appl. No. 11/140,561 dated Jul. 12, 2005.
Austrian Search Report in U.S. Appl. No. 11/077,974 dated Jul. 14, 2005.
Office Action in U.S. Appl. No. 11/077,974 dated Oct. 3, 2008.
Amendment and Response in U.S. Appl. No. 11/077,974 dated Feb. 2, 2009.
Official Communication in Chinese App. No. 200510105051.1 dated Mar. 28, 2008.

Official Communication in Chinese App. No. 200510105051.1 dated Dec. 19, 2008.
Official Communication in European App. No. 05255646.1 dated Oct. 12, 2007.
Official Communication in Japanese App. No. 2005-260607 dated Sep. 26, 2008.
Official Communication in U.S. Appl. No. 11/208,085 dated Dec. 10, 2008.
Petschick, et.al., "Fabry-Perot-Interferometer", May 14, 2002, available at http://pl.physik.tu-berlin.de/groups/pg279/protokolless02/04_fpi.pdf.
European Search Report in App. No. 05255714 dated Apr. 14, 2009 (European Publication No. EP 1 640779).
Office Action in U.S. Appl. No. 11/077,974 dated May 8, 2009.
Office Action in European App. No. 05 255 646.1 dated Apr. 27, 2009.
Amendment and Response in U.S. Appl. No. 11/208,085 dated Jun. 8, 2009.
Notice of Allowance in U.S. Appl. No. 11/208,085 dated Sep. 14, 2009.
Amendment in U.S. Appl. No. 11/077,974 dated Aug. 10, 2009.
Advisory Action in U.S. Appl. No. 11/077,974 dated Aug. 31, 2009.
RCE and Amendment in U.S. Appl. No. 11/077,974 dated Sep. 8, 2009.
Interview Summary in U.S. Appl. No. 11/077,974 dated Sep. 30, 2009.
WU, "Design of a Reflective Color LCD Using Optical Interference Reflectors", Asia Display '95, pp. 929-931, (Oct. 1995).
"Glass Polarizing and Interference Filters," American Institute Of Physics Handbook, pp. 6-172- 6-178, 1982.
Office Action in U.S. Appl. No. 11/077,974 mailed Nov. 23, 2009.
Office Action in Chinese Application No. 200510105051.1 mailed Jan. 8, 2010.
Office Action in Japanese Application No. 2005-260607 mailed Nov. 10, 2009.
RCE and IDS in U.S. Appl. No. 11/208,085 mailed on Nov. 13, 2009.
Preliminary Amendment in U.S. Appl. No. 11/208,085 mailed on Dec. 14, 2009.
Notice of Allowance in U.S. Appl. No. 11/208,085 mailed on Dec. 29, 2009.
Amendment and Response to Office Action in U.S. Appl. No. 11/077,974 mailed Feb. 23, 2010.
Notice of Allowance in U.S. Appl. No. 11/077,974 mailed Apr. 9, 2010.
RCE and IDS in U.S. Appl. No. 11/077,974 mailed Jul. 8, 2010.
Amendment in U.S. Appl. No. 11/077,974 mailed Jul. 16, 2010.
Notice of Allowance in U.S. Appl. No. 11/077,974 mailed Jul. 22, 2010.
Notice of Allowance in U.S. Appl. No. 11/208,085 mailed Dec. 29, 2009.
Issue Fee Payment and 312 Amendment in U.S. Appl. No. 11/208,085 mailed Mar. 26, 2010.
Response to 312 Amendment in U.S. Appl. No. 11/208,085 mailed Apr. 15, 2010.
RCE, Amendment and Petition to Withdraw from Issue in U.S. Appl. No. 11/208,085 mailed May 25, 2010.
Petition Decision in U.S. Appl. No. 11/208,085 mailed May 27, 2010.
Notice of Allowance in U.S. Appl. No. 11/208,085 mailed Jul. 6, 2010.
Office Action in Japanese Application No. 2007-533524 mailed Jun. 8, 2010.
Notice of Allowance in U.S. Appl. No. 11/213,659 mailed Apr. 8, 2010.
Amendment in U.S. Appl. No. 11/213,659 dated Feb. 25, 2010.
Demiryont et al., "Innovative Transparent Elctrode for Flexible Displays," Defense, Security, Cockpit and Future display II, Proc. Of SPIE vol. 6225, 622519, Apr. 2006.
Mark W. Miles, "A New Reflective FPD Technology Unsing interfermotric modulation" Journal of the Society or Information Display vol. 5, No. 4 pp. 379-382, 1997.
Mark W. Miles, "Interfermoteric Modulation: A MEMS Based Technology for the Modulation of Light," Final Program and Proceedints IS&T's 50th Annual Conference, pp. 674-677, 1997.

Mark. W. Miles, "MEMS-based Interferometric Modulator for Display Applications," Proceedings of SPIE Micromached Devices and Components, pp. 20-28, 1999.
Shane DeWitt, "Integrating Touch Screens and Optical Films: When, Where, and How?" 3M touch Systems, Society for Information Display, Americas Display Engineering & Applications Conference, Oct. 24-27, 2005, Portland, Oregan U.S.A.
International Preliminary Report of Patentability in PCT/US2005/032426; (International Publication No. WO 2006/036524) dated Apr. 5, 2007.
International Preliminary Report on Patentability in PCT/US2005/032335 (International Publication No. WO 2006/036519 ) dated Apr. 5, 2007.
Applicant Summary of Interview in U.S. Appl. No. 11/077,974, dated Oct. 29, 2009.
Request for Continued Examination (RCE) and Information Disclosure Statement (IDS) in U.S. Appl. No. 11/077,974, dated Oct. 21, 2010.
Supplemental Amendment in U.S. Appl. No. 11/077,974, dated Oct. 29, 2010.
Notice of Allowance in U.S. Appl. No. 11/077,974, dated Nov. 2, 2010.
Office Action in Mexican Application No. PA/a/2005/010242 dated Apr. 17, 2008.
Request for continued Examination and Information Disclosure Statement in U.S. Appl. No. 11/208,085, dated Oct. 8, 2010.
Preliminary Amendment in U.S. Appl. No. 11/208,085, dated Oct. 8, 2010.
Notice of Allowance in U.S. Appl. No. 11/208,085, dated Oct. 29, 2010.
Chemical Properties Handbook, McGraw-Hill, 1999, Refractive Index, Dipole Moment and Radius of Gyration; Inorganic compounds, No. 151: O2Si.
Nakagawa et al., "Wide-Field -of-View Narrow-Band Spectral Filters Based on Photonic Crystal Nanocavities", Optical Society of America, Optics Letters vol. 27, No. 3, pp. 191-193, 2002.
Extended European Search Report in Application No. 10176512.1 dated Oct. 22, 2010.
International Preliminary Report and Written Opinion in PCT/US2005/032633 dated Apr. 5, 2007.
Office Action in U.S. Appl. No. 11/051,258 mailed Nov. 22, 2006.
Amendment to Office Action in U.S. Appl. No. 11/051,258 dated Feb. 22, 2007.
Office Action in U.S. Appl. No. 11/051,258 mailed May 18, 2007.
RCE, Information Disclosure Statement, and Response to Office Action in U.S. Appl. No. 11/051,258 dated Aug. 17, 2007.
Interview Summary in U.S. Appl. No. 11/051,258 mailed Aug. 23, 2007.
Supplemental Amendment in U.S. Appl. No. 11/051,258 dated Oct. 10, 2007.
Office Action in U.S. Appl. No. 11/051,258 mailed Jan. 3, 2008.
Interview Summary in U.S. Appl. No. 11/051,258 mailed Apr. 18, 2008.
Amendment and Response in U.S. Appl. No. 11/051,258 dated May 5, 2008.
Notice of Allowance U.S. Appl. No. 11/051,258 mailed Jun. 17, 2008.
RCE and Information Disclosure Statement in U.S. Appl. No. 11/051,258 dated Sep. 16, 2008.
Notice of Allowance U.S. Appl. No. 11/051,258 mailed Oct. 10, 2008.
RCE and Information Disclosure Statement in U.S. Appl. No. 11/051,258 dated Jan. 8, 2009.
Office Action in U.S. Appl. No. 11/051,258 mailed Feb. 3, 2009.
Interview Summary in U.S. Appl. No. 11/051,258 mailed Feb. 18, 2009.
Amendment in U.S. Appl. No. 11/051,258 dated May 4, 2009.
Notice of Allowance in U.S. Appl. No. 11/051,258 dated Jul. 13, 2009.
Issue Notification in U.S. Appl. No. 11/051,258, dated Nov. 11, 2009.
Request for Continued Examination, Petition to Withdraw from Issue, and Information Disclosure Statement in U.S. Appl. No. 11/051,258, dated Nov. 24, 2009.

Petition Decision—Grant—Notice of withdrawal from issue in U.S. Appl. No. 11/051,258, dated Nov. 25, 2009.
Notice of Allowance in U.S. Appl. No. 11/051,258, dated Dec. 17, 2009.
Preliminary Amendment in U.S. Appl. No. 12/625,461, dated Jun. 10, 2010.
Notice of Allowance in U.S. Appl. No. 12/625,461, dated Dec. 16, 2010.
Official Communicaiton in Chinese Application No. 2005101035579 dated May 9, 2008.
Office Action in European Application No. EP 05255657 dated Oct. 12, 2006.
Office Action in European Application No. EP 05 255657 dated Mar. 2, 2010.
Office Action in Japanese Application No. 2005-235802, dated Nov. 4, 2009.
Decision of Rejection in Japanese Application No. 2005-235802, dated Nov. 4, 2009.
Official Communication in Mexican Application No. PA/a/2005/009406 dated May 6, 2008.
Applicant Summary of Interview in U.S. Appl. No. 11/077,974, dated Oct. 29, 2009.
Amendment After Allowance Under 37 C.F.R. § 1.312 and Issue Fee in U.S. Appl. No. 11/077,974, dated Feb. 1, 2011.
Supplemental Notice of Allowance in U.S. Appl. No. 11/077,974, dated Feb. 7, 2011.
Office Action in U.S. Appl. No. 11/213,659 dated Oct. 29, 2008.
Amendment and Response in U.S. Appl. No. 11/213,659 dated Mar. 30, 2009.
Notice of Allowance in U.S. Appl. No. 11/213,659 dated Jul. 20, 2009.
Request for Continued Examination (RCE) and Information Disclosure Statement in U.S. Appl. No. 11/213,659, dated Feb. 17, 2010.
Notice of Allowance and Fees Due in U.S. Appl. No. 11/213,659, dated Nov. 18, 2009.
Request for Continued Examination (RCE) and Information Disclosure Statement in U.S. Appl. No. 11/213,659, dated Feb. 17, 2010.
Request for Continued Examination (RCE) and Information Disclosure Statement, and Petition ot Withdraw form Issue in U.S. Appl. No. 11/213,659, dated Aug. 18, 2010.
Petition Grant in U.S. Appl. No. 11/213,659, dated Aug. 19, 2010.
Amendment in U.S. Appl. No. 11/213,659, dated Aug. 27, 2010.
Notice of Allowance in U.S. Appl. No. 11/213,659, dated Sep. 21, 2010.
Office Action in European Application No. EP 05800920.0 dated May 21, 2008.
Summons to attend oral proceedings in European Application No. 05800920, dated Dec. 4, 2009.
Result of consultation in European Application No. 05800920, dated Feb. 23, 2010.
Minutes of the Oral Proceedings in European Application No. 05 800 920.1, dated May 20, 2010.
Notice of Intention in Grant in European Application No. 05800920, dated Jun. 2, 2010.
Application as filed in U.S. Appl. No. 12/849,750, Aug. 3, 2010.
Office Action in U.S. Appl. No. 12/849,750, Feb. 1, 2011.

* cited by examiner

| | Column Output Signals | |
|---|---|---|
| | +V$_{bias}$ | -V$_{bias}$ |
| Row Output Signals 0 | Stable | Stable |
| +ΔV | Relax | Actuate |
| −ΔV | Actuate | Relax |

METHOD AND APPARATUS FOR PROVIDING BRIGHTNESS CONTROL IN AN INTERFEROMETRIC MODULATOR (IMOD) DISPLAY

FIELD OF THE INVENTION

The present invention relates generally to display devices, and more particularly to brightness control in interferometric modulator display devices.

BACKGROUND OF THE INVENTION

Microelectromechanical systems (MEMS) include micromechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by a transparent medium (e.g., an air gap). As described herein in more detail, the position of one plate in relation to the other plate can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

An interferometric modulator display device generally comprises multiple pixels, in which each pixel is operable to provide a range of visual colors, for example, by changing the position of a corresponding plate (e.g., the metallic membrane) in relation to another plate (e.g., the stationary layer) to shift a color perceived by a user. Conventional interferometric modulator display devices, however, typically do not have a brightness control (for each pixel) that is independent of pixel color—i.e., in conventional interferometric modulator display devices the brightness of a pixel is usually controlled by shifting a color of the pixel to an unperceivable color. Consequently, brightness control in conventional interferometric modulator displays is generally limited.

Accordingly, what is needed is an improved technique for providing brightness control in an interferometric modulator display. The present invention addresses such a need.

BRIEF SUMMARY OF THE INVENTION

In general, in one aspect, this specification describes an interferometric modulator display pixel that includes a microelectromechanical systems (MEMS) interferometric modulator having an associated first color spectrum, and a color absorber located substantially in front of the interferometric modulator display pixel, in which the color absorber has an associated second color spectrum. The microelectromechanical systems (MEMS) interferometric modulator is operable to shift the first color spectrum relative to the second color spectrum to control a visual brightness of the interferometric modulator display pixel independent of a color of the interferometric modulator display pixel.

Implementations may provide one or more of the following advantages. An interferometric modulator display is provided that implements brightness control (for each pixel) that is independent of a color associated with a pixel. Accordingly, an interferometric modulator display can provide a greater visual display of color gradations and shade in comparison to conventional interferometric modulator displays. In addition, the range of colors of such a display changes less with changes in spectrum of the ambient illumination.

BRIEF DESCRIPTION OF THE DRAWINGS

FIGS. 10A-10C illustrate color spectra associated with an interferometric modulator of FIG. 7.

Like reference symbols in the various drawings indicate like elements.

DETAILED DESCRIPTION OF THE INVENTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As discussed above, conventional interferometric modulator display devices typically do not have a brightness control (for each pixel) that is independent of pixel color. That is, in conventional interferometric modulator display devices the brightness of a pixel is usually controlled by shifting a color of the pixel to an unperceivable color. Thus, brightness control within conventional interferometric modulator display devices is generally limited. Accordingly, this specification describes an improved technique for providing brightness control in an interferometric modulator display. In one embodiment, an interferometric modulator display pixel is provided that includes a microelectromechanical systems (MEMS) interferometric modulator having an associated first color spectrum. The microelectromechanical systems (MEMS) interferometric modulator is operable to shift the first color spectrum relative to a second color spectrum to control a visual brightness of the interferometric modulator display pixel independent of a color of the interferometric modulator display pixel.

First, a description of an interferometric modulator display embodiment will be described which has been conceived and reduced to practice by QUALCOMM Inc. This display operates effectively for its stated purpose. However, it is always desirable to improve on the performance thereof. To describe this modulator and its operation refer now to the following description in conjunction with the accompanying figures.

Figure 1:
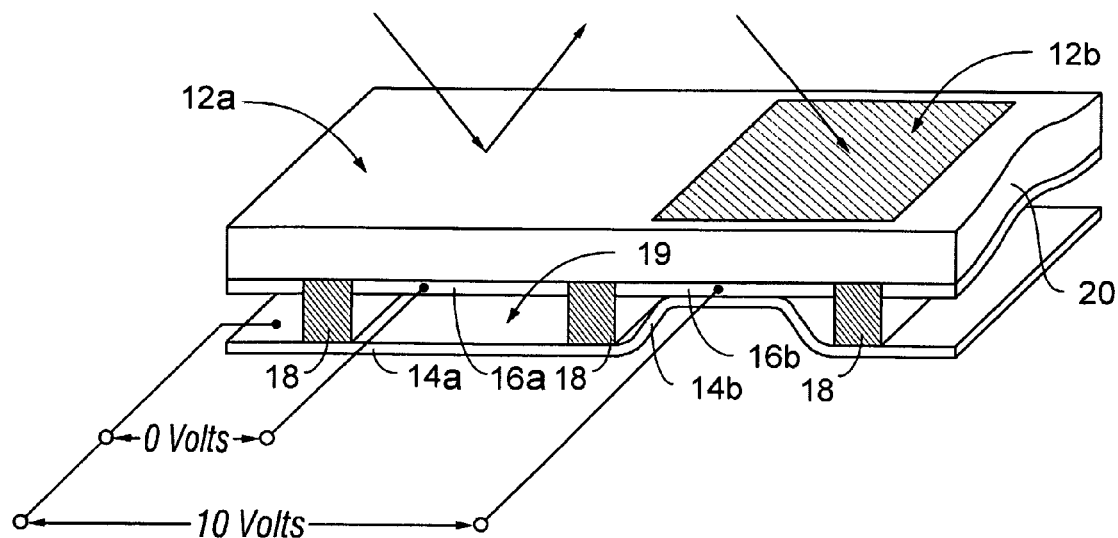
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the fixed partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not shown) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in accordance with the embodiment of FIG. 1 in a display application.

Figure 2:
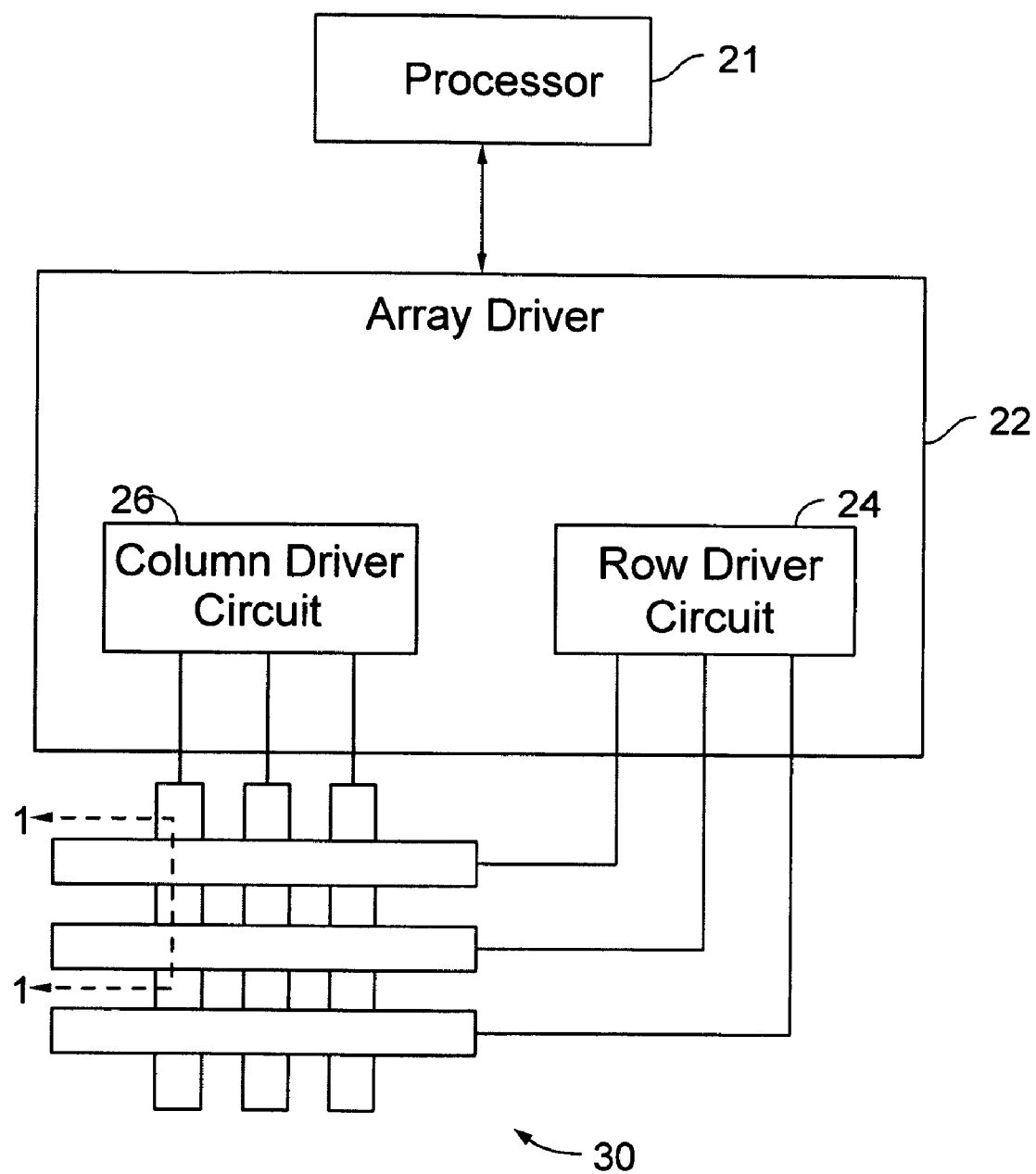
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single-chip or multi-chip microprocessor such as an ARM (Advanced RISC Machine), Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window."

Figures 3, 4:
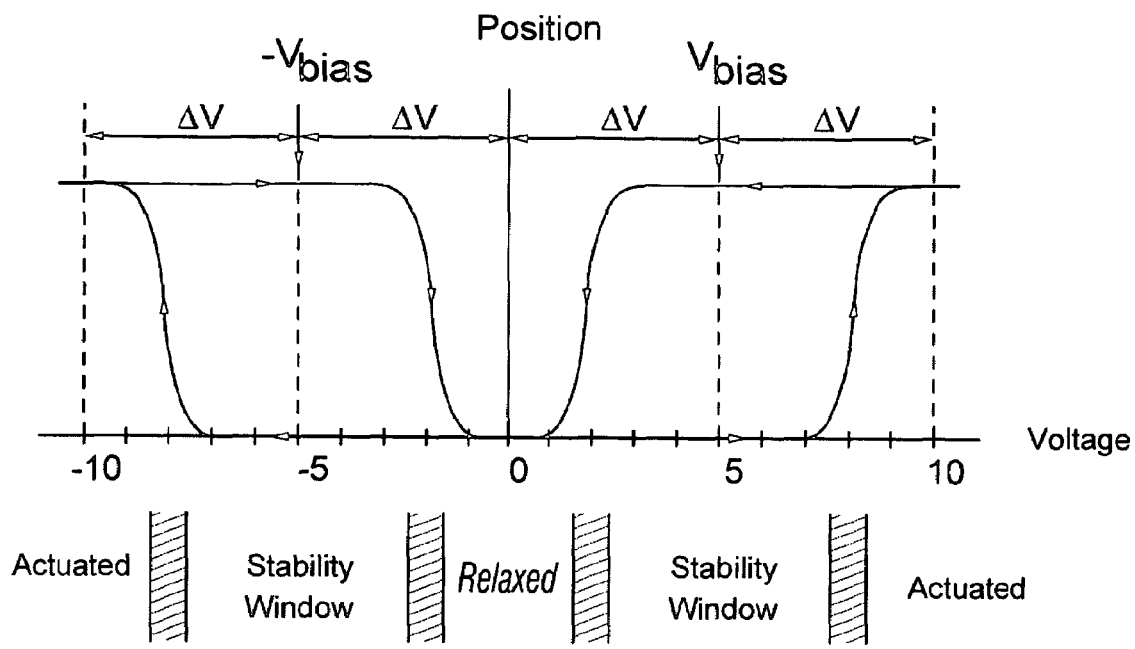
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 5A:
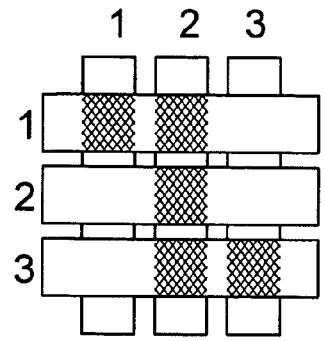
FIGS. 5A-5B illustrate one exemplary timing diagram for row and column signals that may be used to write a frame of display data to the 3×3 interferometric modulator display of FIG. 2.
Figure 5B:
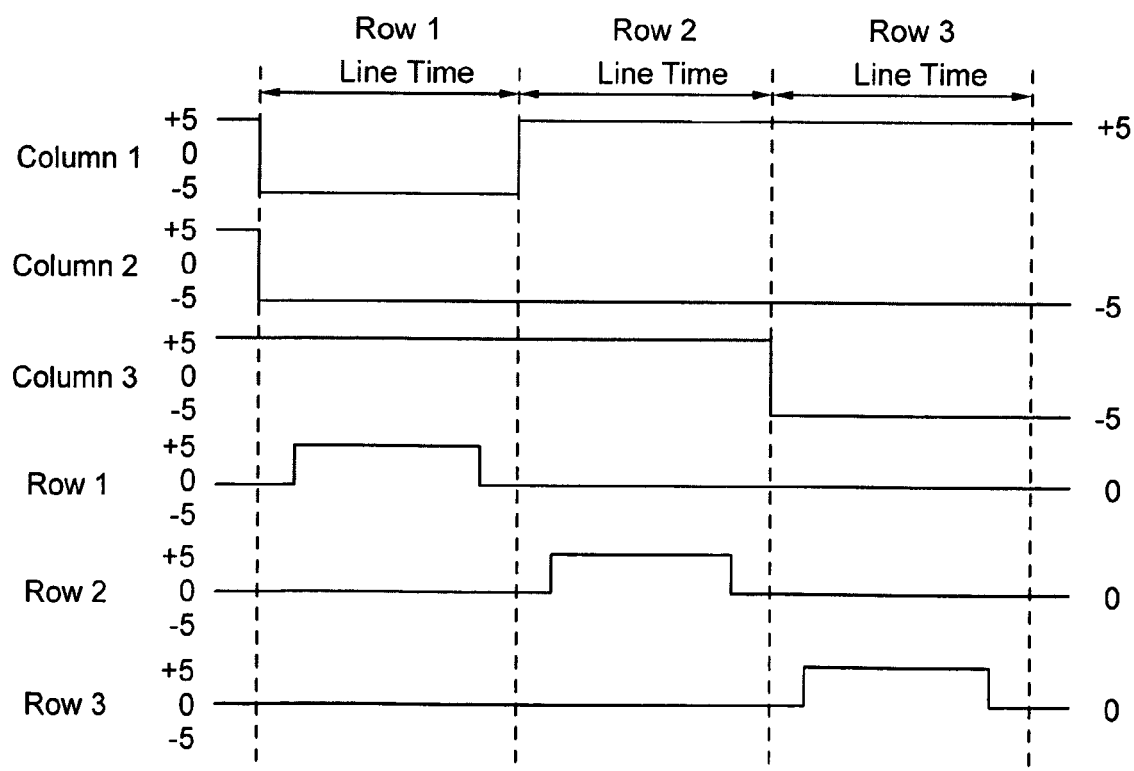

FIGS. 4 and 5A-5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the embodiment shown in FIG. 4, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$ or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the frame shown in FIG. 5A, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
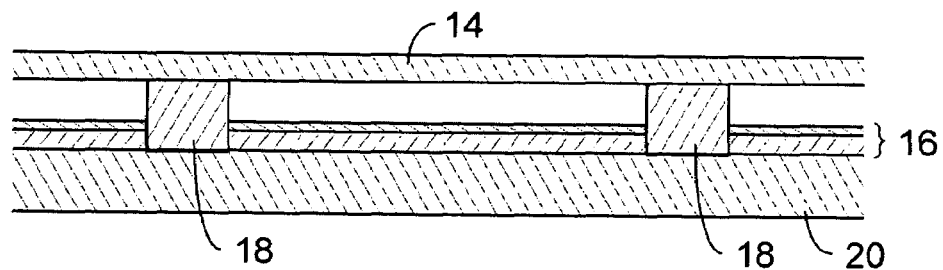
FIG. 6A is a cross section of an interferometric modulator of FIG. 1.
Figure 6B:
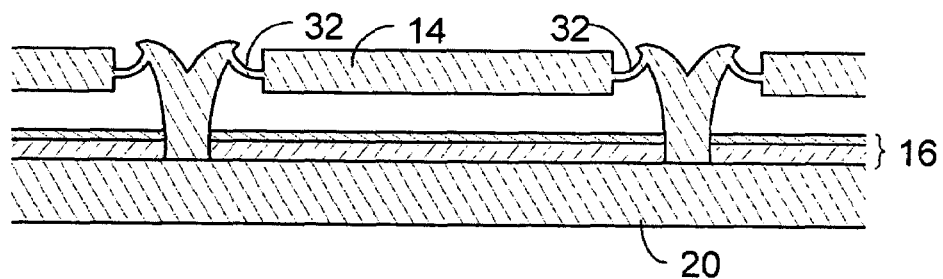
FIGS. 6B-E are alternative embodiments of an interferometric modulator.
Figure 6C:
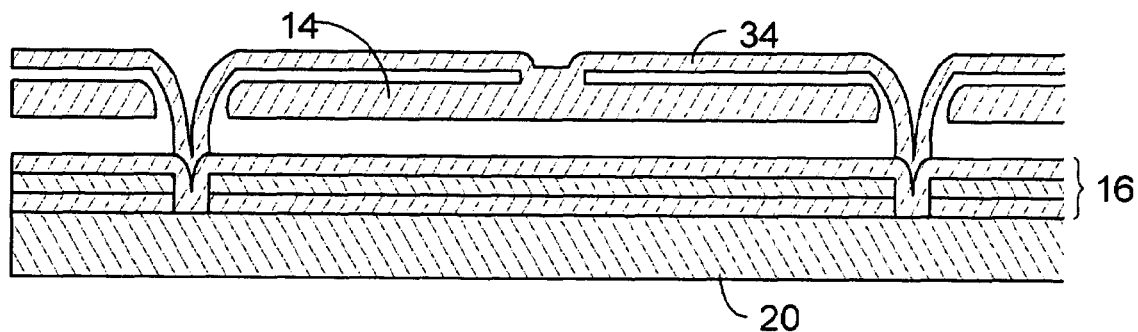
Figure 6D:
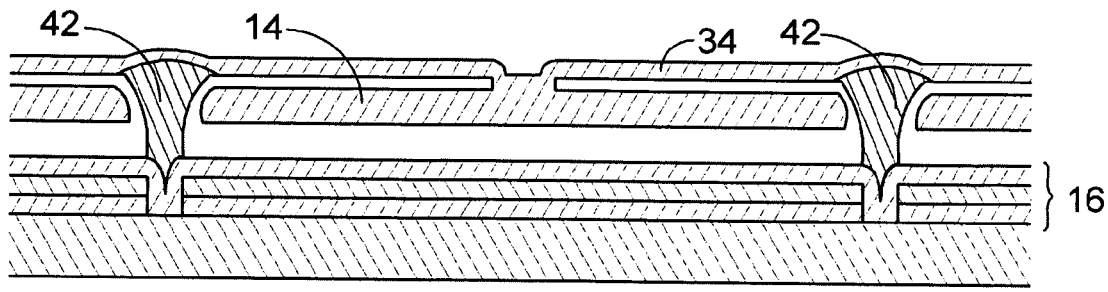
Figure 6E:
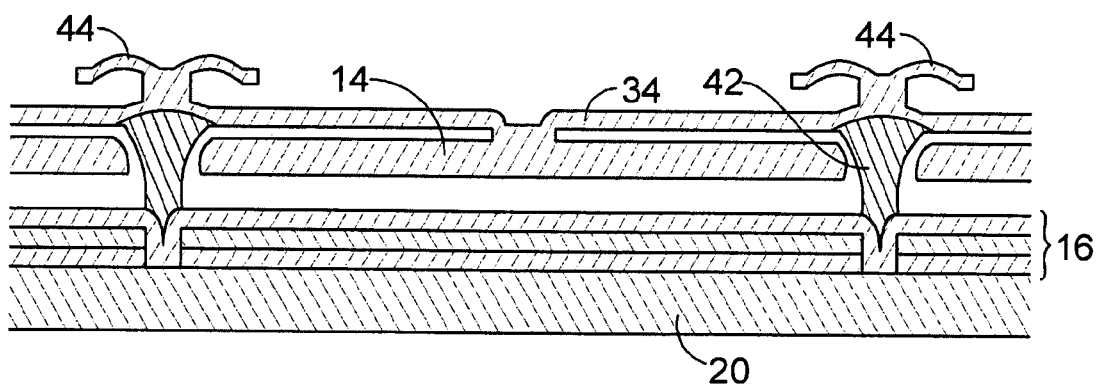

FIG. 6A is a cross section of the embodiment of FIG. 1, where a strip of metal material 14 is deposited on orthogonally extending supports 18. In FIG. 6B, the moveable reflective layer 14 is attached to supports at the corners only, on tethers 32. In FIG. 6C, the moveable reflective layer 14 is suspended from a deformable layer 34, which may comprise a flexible metal. The deformable layer 34 connects, directly or indirectly, to the substrate 20 around the perimeter of the deformable layer 34. These connections are referred to herein as support posts. The embodiment illustrated in FIG. 6D has support post plugs 42 upon which the deformable layer 34 rests. The movable reflective layer 14 remains suspended over the gap, as in FIGS. 6A-6C, but the deformable layer 34 does not form the support posts by filling holes between the deformable layer 34 and the optical stack 16. Rather, the support posts are formed of a planarization material, which is used to form support post plugs 42. The embodiment illustrated in FIG. 6E is based on the embodiment shown in FIG. 6D, but may also be adapted to work with any of the embodiments illustrated in FIGS. 6A-6C as well as additional embodiments not shown. In the embodiment shown in FIG. 6E, an extra layer of metal or other conductive material has been used to form a bus structure 44. This allows signal routing along the back of the interferometric modulators, eliminating a number of electrodes that may otherwise have had to be formed on the substrate 20.

In the above-identified modulators of FIG. 1, there are two states for operation of the device: relaxed and activated. When the device is actuated snap-in has occurred, that is, the moveable membrane has moved into engagement based upon the "hysteresis window". In one embodiment, a modulator in accordance with the present invention avoids this instability to provide stable control of the brightness using the applied voltage. To describe this feature in more detail, refer now to the following description in conjunction with the accompanying figures.

At equilibrium, the electrostatic and mechanical spring forces will be equal:

$$F_{mechanical} = F_{electrostatic}$$

$$k \cdot x = \frac{\varepsilon_0 \cdot A \cdot V^2}{2 \cdot \left(\frac{x_{dielectric}}{\varepsilon_{dielectric}} + x_{air} - x\right)^2}$$

where A is the area of the pixel, and $\varepsilon_0$ is the permittivity of space, $\varepsilon_{dielectric}$ is the relative dielectric constant of the dielectric material, k is the spring constant, V is the applied voltage, and $x_{air}$ is the maximum thickness of the air gap.

Figure 7:
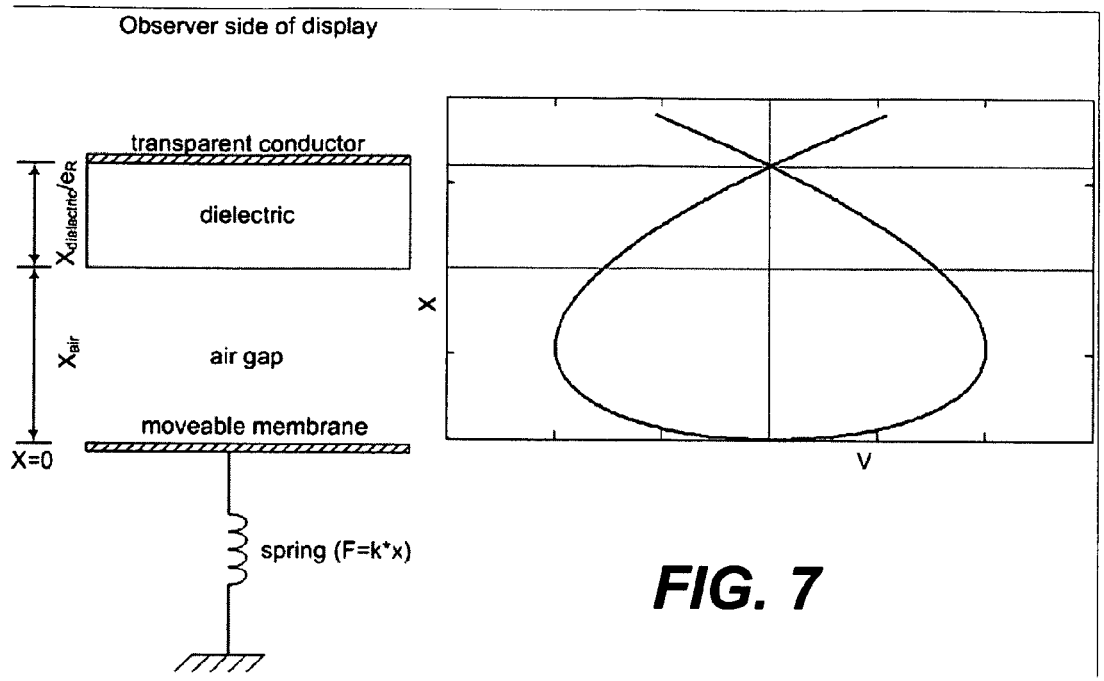
FIG. 7 illustrates a graph of an equilibrium equation for an interferometric modulator.

A graph of this equilibrium equation is shown in FIG. 7. As is seen in this figure, there are two places where the slope of x becomes infinite. Finding the snap-in instability point using V as the independent variable is mathematically difficult. It is easier to consider V as a dependent function of x, then setting the derivative of dV/dx equal to zero:

$$0 = \frac{dV}{dx} = \frac{d}{dx}\sqrt{\frac{2 \cdot k \cdot \left(\frac{x_{dielectric}}{\varepsilon_{dielectric}} + x_{air} - x\right)^2}{\varepsilon_0 \cdot A}}$$

After differentiation and a little simplification, this becomes:

$$x = \frac{\frac{x_{dielectric}}{\varepsilon_{dielectric}} + x_{air}}{3}$$

Accordingly, it has been found that approximately for ⅓ of the total distance between the two electrodes, the members can be controlled. The important point is that the control voltage may extend from 0 either positive or negative for small excursions, as long as the point of instability is not exceeded. If the voltage exceeds the instability voltage, then the moveable membrane will snap down to the dielectric, and there will no longer be a one-to-one correspondence between applied voltage and the membrane position (at least until the voltage is brought close to zero again).

Figure 8:
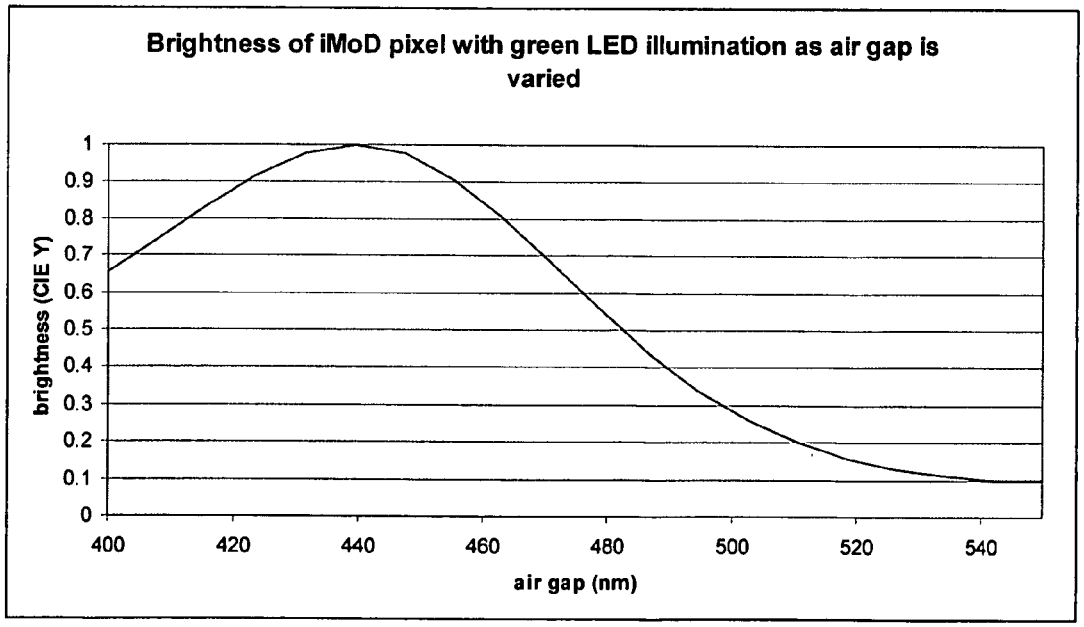
FIG. 8 illustrates the simulated brightness of an interferometric modulator using a green LED as the illumination source as a function of the air gap size.

FIG. 8 illustrates the simulated brightness of an interferometric modulator using a green LED as the illumination source as a function of the air gap size in accordance with one embodiment of the invention.

Assuming the spring for this interferometric modulator is arranged so its force is zero at a gap of 540 nm, the point of instability is at 540 nm*(1−⅓)=360 nm. Since the maximum brightness is at 440 nm, this interferometric modulator may be controlled in an analog fashion from minimum brightness (at 540 nm) to maximum brightness (at 440 nm) without concern for the snap-in instability point.

Figure 9:
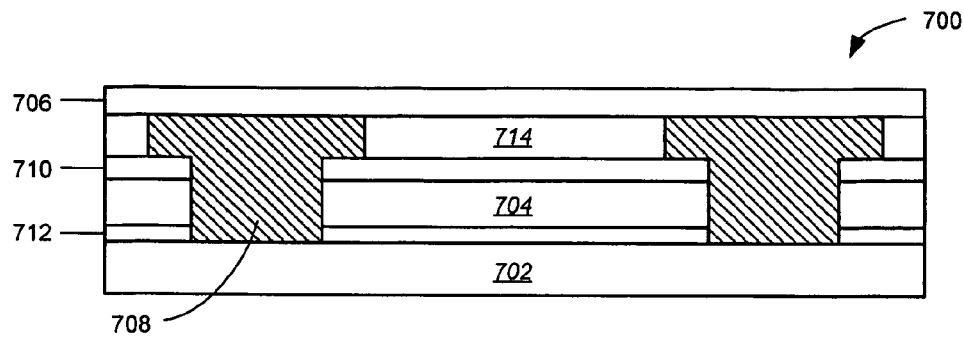
FIG. 9 is a cross section of an interferometric modulator according to one embodiment of the invention.

FIG. 9 illustrates a cross-section of an interferometric modulator 700 in accordance with one embodiment of the present invention. The interferometric modulator 700 includes a substrate 702, an optical stack 704, a mechanical layer 706, and support posts 708 to support the mechanical layer 706. In one embodiment, the substrate 702 is substantially transparent and/or translucent. For example, the substrate 702 can be glass, silica, and/or alumina. In one embodiment, the optical stack 704 comprises several fused layers, including an electrode layer (e.g., indium tin oxide (ITO)), a partially reflective layer (e.g., chromium), and a transparent dielectric. The partially reflective layer can be formed from a variety of materials that are partially reflective such as various metals, semiconductors, and dielectrics. The partially reflective layer can be formed of one or more layers of materials, and each of the layers can be formed of a single material or a combination of materials. In one embodiment, the interferometric modulator 700 further includes an oxide layer 710 to electrically isolate the mechanical layer 706 from the optical stack 704 when the mechanical layer 706 is activated.

The interferometric modulator 700 also includes a color absorber 712, for example, to provide for brightness control. In general, the color absorber 712 substantially absorbs light except light at a peak color, or absorbs light except light within a pre-determined range of wavelengths. For example, referring to FIG. 10A, the color absorber 712 can have an associated color spectrum 804 with a peak color of green (e.g., a color at a wavelength substantially near 520 nm) as shown in graph 800A. Also, the interferometric modulator 700, at some position has an associated (reflectance) color spectrum that reflects light at a given peak wavelength.

For example, as shown in graph 800A, the interferometric modulator 700 in a relaxed position (ignoring the effect of the absorber 712), has a peak reflectance color of red (e.g., a color at a wavelength substantially near 700 nm). An associated color spectrum 806 centered at approximately 700 nm is illustrated. A visual brightness of color associated with the interferometric modulator 700 is a result of the combination of the color spectrum 804 (associated with the color absorber 712) and the color spectrum 806 (from the interferometric modulator 700 in a relaxed position and ignoring the effect of the absorber upon the interferometric modulator) as shown in graph 800B of FIG. 10A. In one embodiment, the final color, represented by color spectrum 808, is the product of the inteferometric modulator reflectance spectrum and the square of the absorber transmittance spectrum, since the light has to pass through the absorber twice. As the mechanical layer 706 moves closer to the optical stack 704 (through the gap 714), the light reflectance properties of the interferometric modulator changes, and accordingly, the (reflectance) color spectrum associated with the interferometric modulator 700 shifts.

Figure 10C:
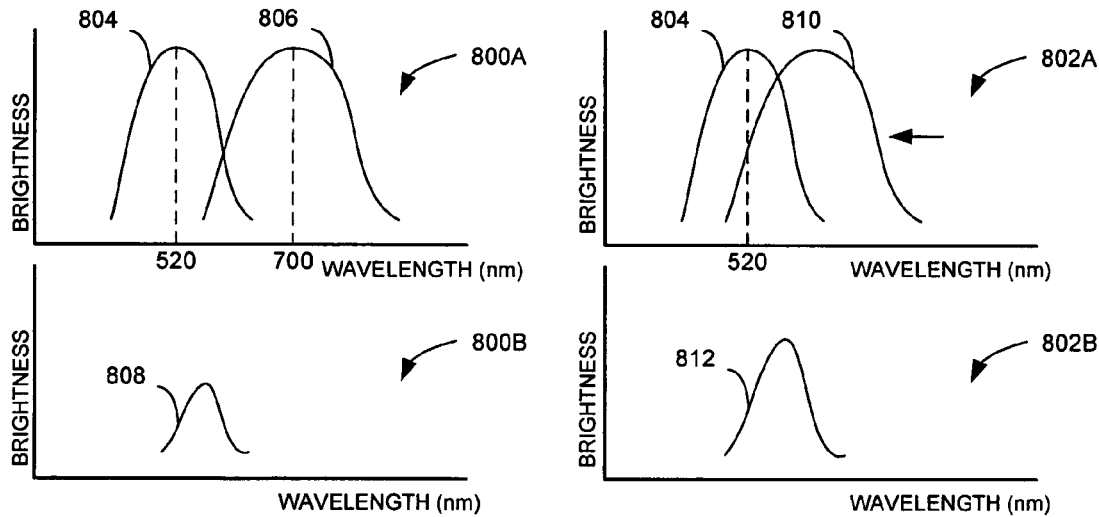
Figure 10C:
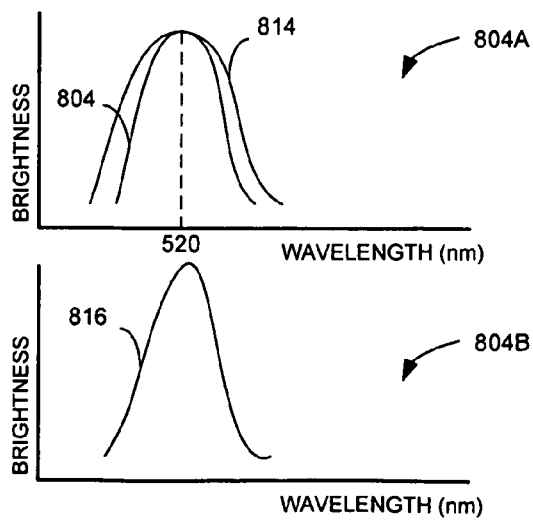

Referring to the example graphs of 802A and 804A of FIGS. 10B and 10C, respectively, as the mechanical layer 706 moves closer to the optical stack 704, the color spectrum associated with the interferometric modulator 700 (ignoring for the purposes of this example the effect of the absorber 712) increasingly overlaps with the color spectrum 804 associated with the color absorber 712. The visual brightness of color associated with the interferometric modulator increases with greater overlap between the color spectrum associated with the interferometric modulator 700 and the color spectrum associated with the color absorber 712 (as shown by graphs 800B, 802B and 804B). In graph 802A, the mechanical layer 706 has moved closer to the dielectric layer 710 and narrowed the gap 714, resulting in a reflected color spectrum 810. The product of the color spectrum 810 with the square of color spectrum 804 results in a color spectrum 812 in graph 802B. Color spectrum 812 covers a greater area than color spectrum 808 and is therefore brighter. Similarly, in graph 804A, the mechanical layer 706 has moved even closer to the dielectric layer 710, resulting in a reflected color spectrum 814. The product of the color spectrum 814 with the square of the color spectrum 804 results in a color spectrum 816 in graph 804B. The color spectrum 816 covers a greater area than the color spectrum 812 and is therefore brighter. In like manner, the visual brightness of color associated with the interferometric modulator decreases with less overlap between the color spectrum associated with the interferometric modulator 700 and the color spectrum associated with the color absorber 712. Thus, unlike conventional interferometric modulators, a visual brightness of the interferometric modulator can be controlled without having to shift a color of the interferometric modulator to an unperceivable color. In one embodiment, interferometric modulator 700 can be activated as described above in connection with FIG. 3. Alternatively, the interferometric modulator 700 can be fully controlled in an analog manner as described in co-pending U.S. patent application entitled "Analog Interferometric Modulator Device", application Ser. No. 11/144,546, which is incorporated herein by reference in its entirety.

Continuously variable control can be provided in a variety of ways. For example, referring again to FIG. 9, one way is to size the gap 714 such that a desired color spectrum results from movement of the mechanical layer 706 through less than the ⅓ snap-through point to the oxide layer 710. Another example is to use a switch to pinch off the voltage before the interferometric modulator has gone to its new state, the amount of voltage, or charge, being enough to close the gap 714 a desired amount, also without exceeding the snap-through point to the oxide layer 710. Another example is to put the reference electrode behind the moveable membrane (instead of using a transparent conductor like ITO). This allows a broader range of gaps before the snap-through at ⅓ of the gap.

Figure 11:
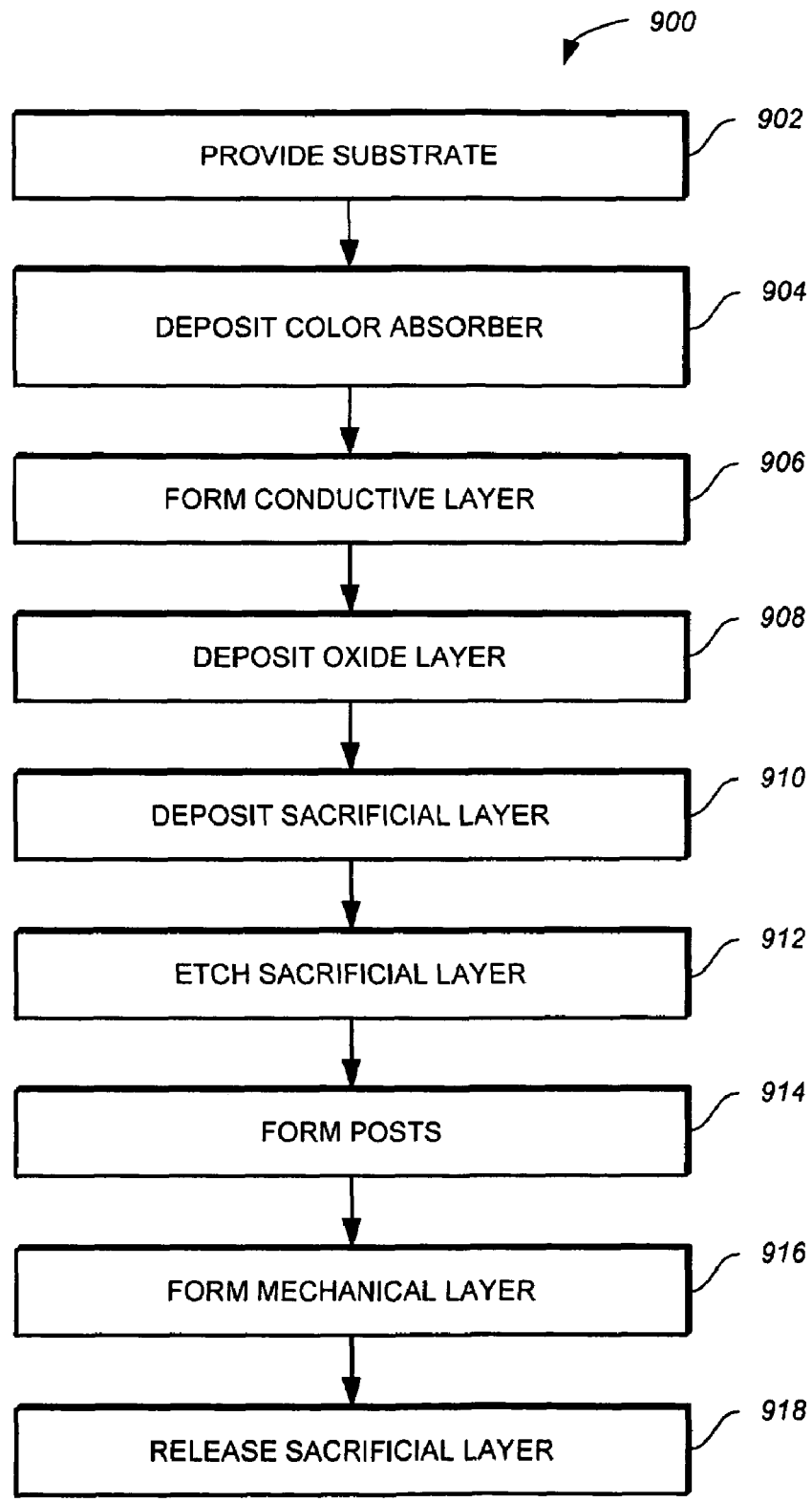
FIG. 11 illustrates a flow diagram illustrating a process for manufacturing an interferometric modulator display according to one embodiment.
Figure 12A:
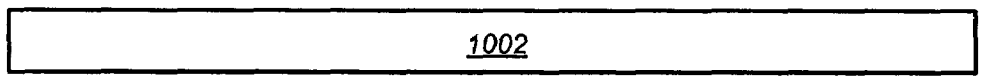
FIGS. 12A-12I illustrate the process of manufacturing an interferometric modulator display according to the process of FIG. 11.
Figure 12B:
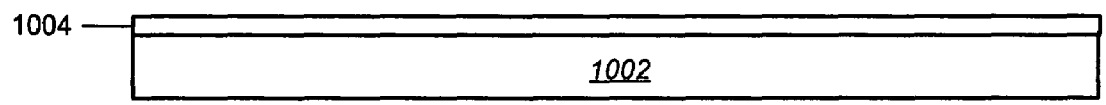
Figure 12C:
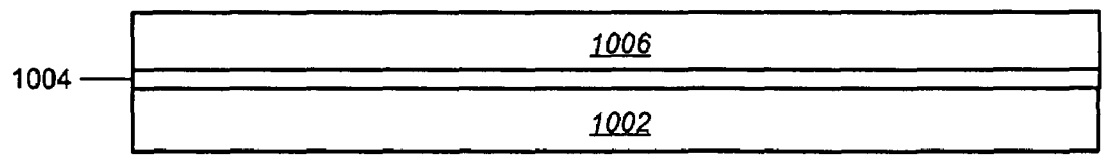
Figure 12D:
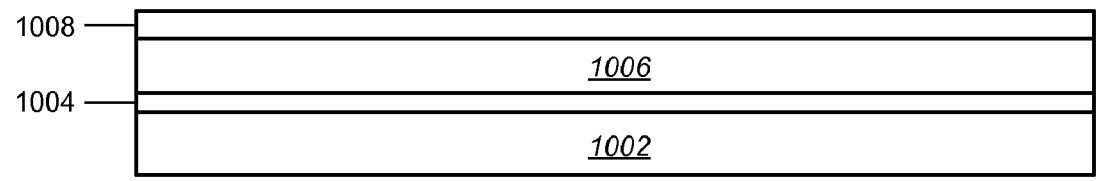
Figure 12E:
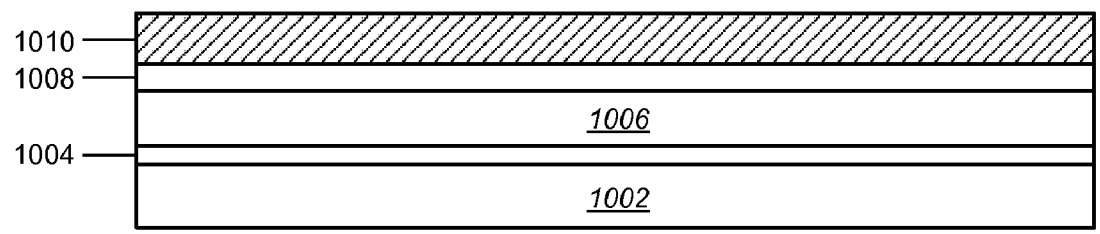

FIG. 11 illustrates a process 900 of fabricating an interferometric modulator (e.g., interferometric modulator 700) in accordance with one embodiment. Referring to FIG. 11, the process 900 begins with providing a substrate (step 902). Referring to the example of FIG. 12A, a substrate 1002 is provided. In one embodiment, the substrate 1002 is substantially transparent and/or translucent. In one embodiment, the substrate 1002 comprises glass. A color absorber is deposited (step 904). As shown in FIG. 12B, a color absorber 1004 is deposited over the substrate 1002. The color absorber 1002 can be a thin film that substantially absorbs light for a predetermined range of wavelengths. A conductive layer is formed (step 906). As shown in FIG. 12C, a conductive layer 1006 is formed over the color absorber 1004. In one embodiment the conductive layer 1006 comprises one or more layers and/or films. For example, in one embodiment the conductive layer 1006 comprises a conductive layer (e.g., indium tin oxide (ITO)) and a partially reflective layer (e.g., chromium). An oxide layer is deposited (step 908). As shown in FIG. 12D, an oxide layer 1008 is deposited over the conductive layer 1006. In one embodiment, the oxide layer 1008 comprises a silicon oxide compound ($Si_xO_y$). A sacrificial layer is deposited (step 910). Referring to FIG. 12E, a sacrificial layer 1010 is deposited over the oxide layer 1008. In one embodiment, the sacrificial layer 1010 comprises molybdenum. In one embodiment, the height of the sacrificial layer 1010 determines the amount of spacing between the conductive layer 1006 (or conductive plate) and a second conductive plate (e.g., a mechanical layer discussed below).

Figure 12F:
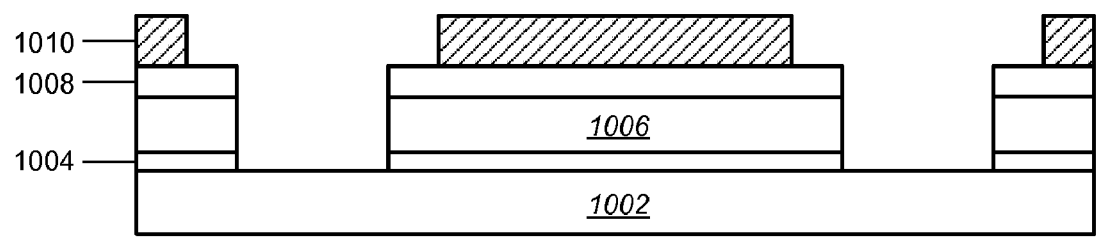
Figure 12G:
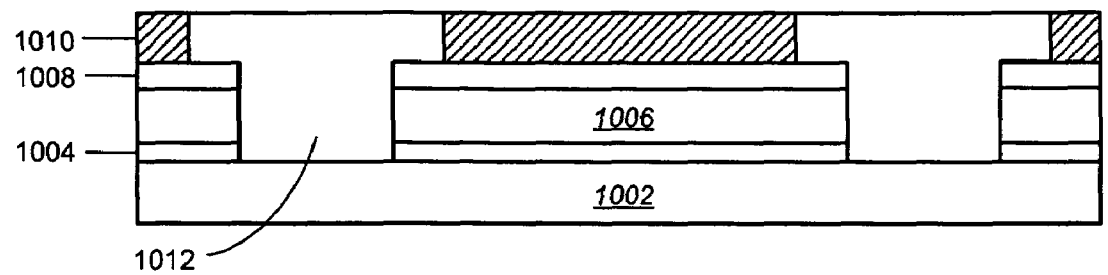
Figure 12H:
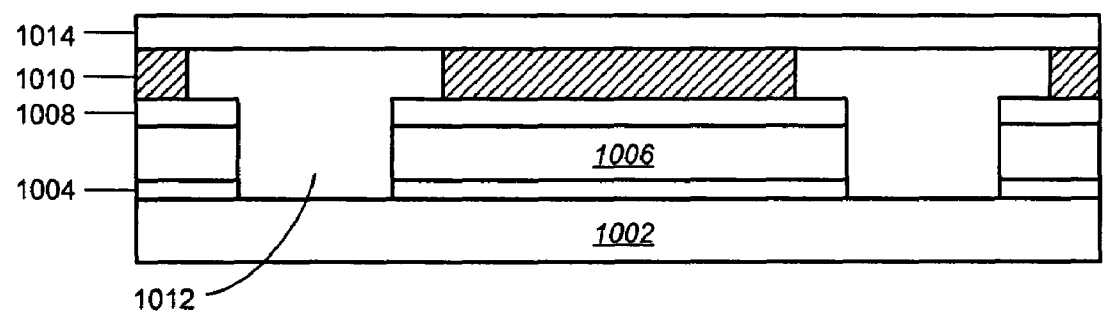
Figure 12I:
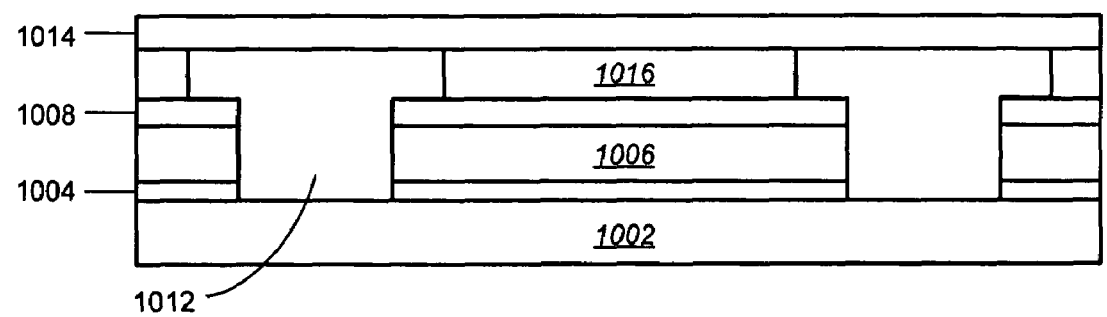

After deposition of the sacrificial layer, the process of forming the support posts for the mechanical layer begins. Accordingly, the sacrificial layer is etched (step 912). Referring to the example of FIG. 12F, the sacrificial layer 1010 is etched at locations where support posts are desired. In addition, one or more layers below the sacrificial layer 1010 can be etched as well. A plurality of posts are formed (step 914). As shown by FIG. 12G, posts 1012 are formed within the etched portions of the layers of the interferometric modulator. In one embodiment, the posts 1012 are formed using a planarization technique followed by photolithography to remove unwanted portions of the material that comprise the posts 1012. The posts 1012 can comprise a polymer. A mechanical layer is formed (step 916). Referring to the example of FIG. 12H, a mechanical layer 1014 is formed over the sacrificial layer 1010 and the posts 1012. In one embodiment, the mechanical layer 1014 comprises a movable reflective layer as discussed above. In one embodiment, the mechanical layer 1014 comprises aluminum/nickel. The sacrificial layer is released (step 918). Referring to FIG. 12I, the sacrificial layer 1010 is released to form an air gap 1016 between the mechanical layer 1014 and the oxide layer 1008. The sacrificial layer 1010 can be released through one or more etch holes formed through the mechanical layer 1014.

Figure 13:
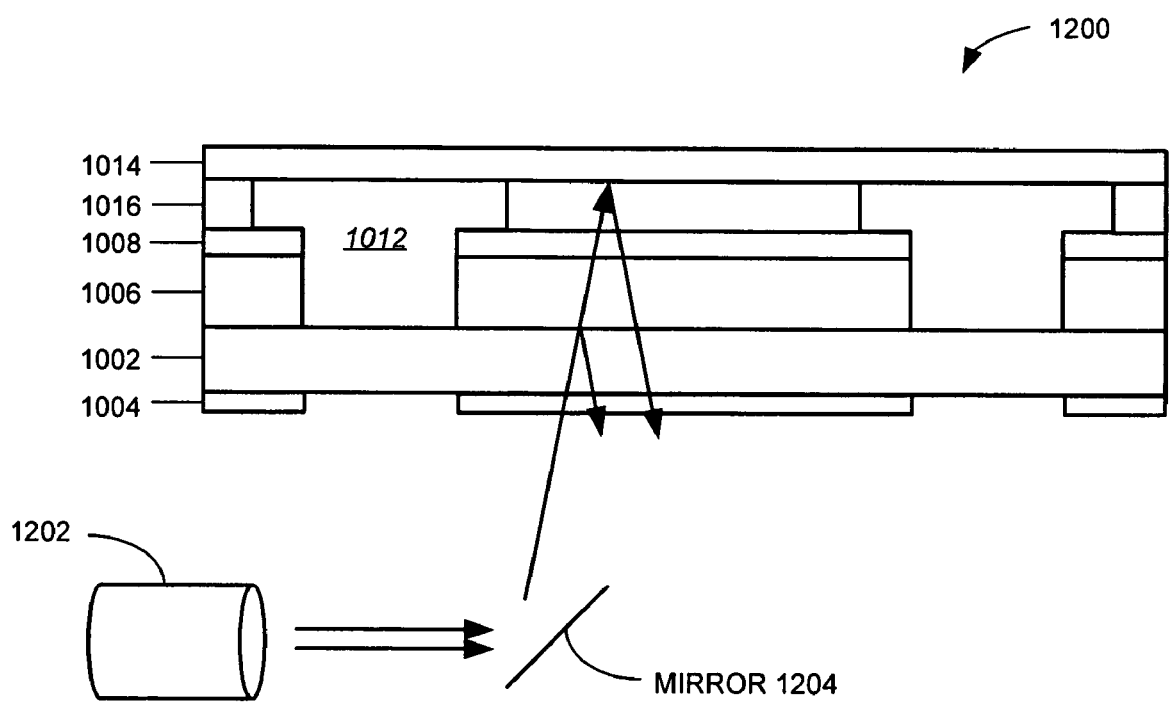
FIG. 13 illustrates a cross section of an interferometric modulator according to one embodiment of the invention.

FIG. 13 illustrates a cross-section of an interferometric modulator 1200 in accordance with one embodiment of the invention. In the embodiment shown in FIG. 13, the color absorber 1004 is deposited on a surface of the substrate 1002 opposite from conductive layer 1006. The interferometric modulator 1200 further includes one or more (colored) light sources 1202 and one or more mirrors 1204 (e.g., half-silvered mirrors) to provide a color spectrum for brightness control. The techniques for brightness control are similar to techniques discussed above. The light sources 1202 can be a narrow spectrum light source (e.g., a laser or LED) or a broad spectrum light (e.g., a white lamp such as a high pressure mercury lamp or a carbon arc lamp). The color absorber 1004 can be a separate device such as a color wheel. In an embodiment in which multiple light sources are implemented, one light source can be used to illuminate only ⅓ of the pixels of an interferometric modulator display, and the other light sources could be used to illuminate the remaining pixels of the interferometric modulator display. Alternatively, one light source could be used to illuminate all of the pixels of an interferometric modulator display at one time, and then during another period of time, a second light source could be used to illuminate all of the pixels of an interferometric modulator display at one time, e.g., in accordance with conventional field sequential color techniques. The embodiment illustrated in FIG. 13 may be used, for example, in a projection display system.

Figure 14A:
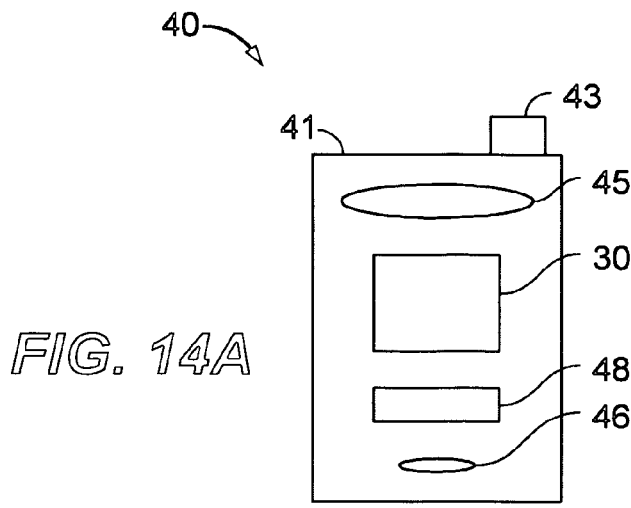
FIGS. 14A-14B are system block diagrams illustrating an embodiment of a visual display device comprising a plurality of interferometric modulators.
Figure 14B:
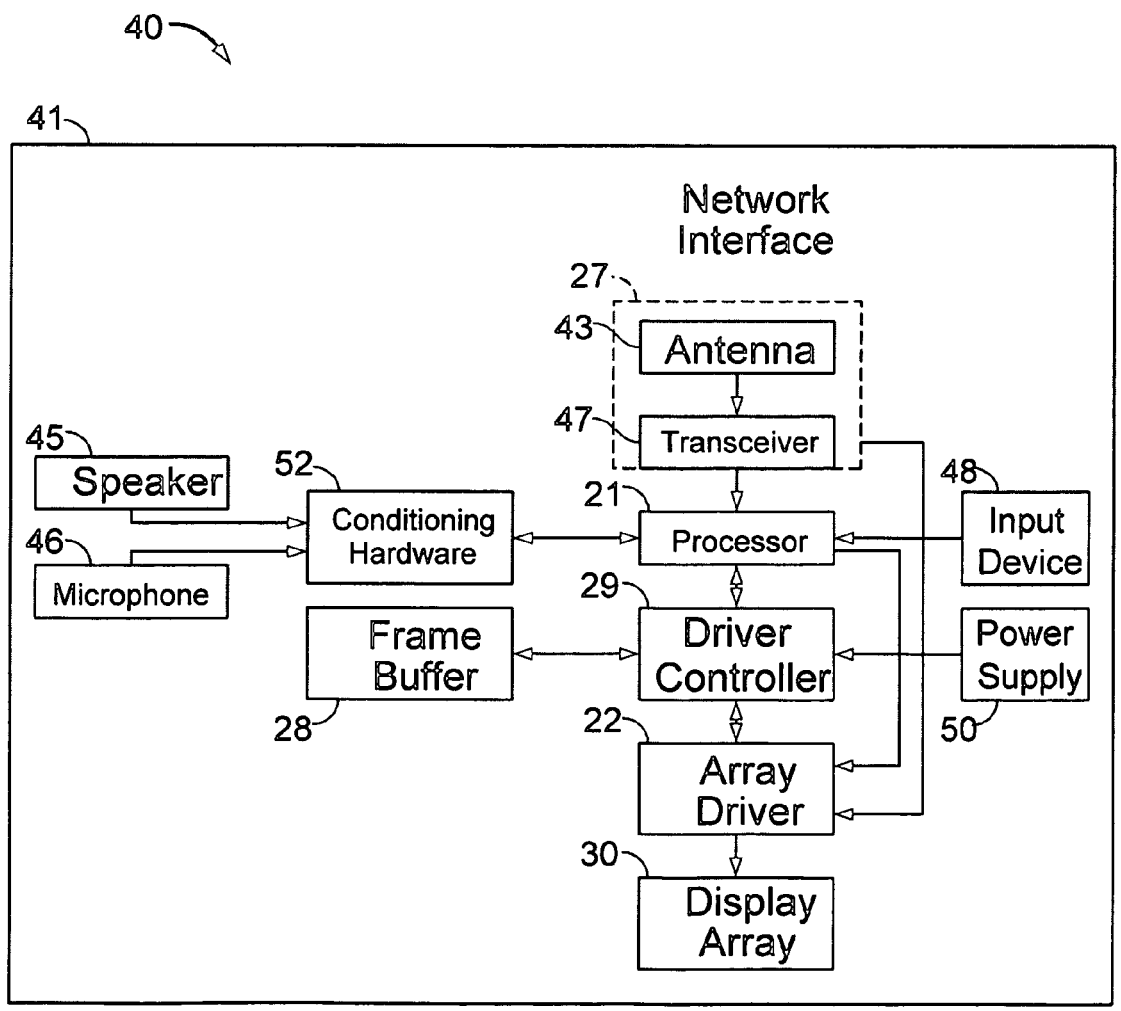

FIGS. 14A and 14B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 14B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the invention is intended to avoid the problems created by using a bi-stable display and bi-stable display driver. In one embodiment, the driver controller 29, array driver 22, and display array 30 are appropriate for any of the types of displays described herein. For example, in one embodiment, driver controller 29 is a conventional display controller (e.g., an interferometric modulator controller). In another embodiment, array driver 22 is a conventional driver (e.g., an interferometric modulator display driver). In one embodiment, a driver controller 29 is integrated with the array driver 22. Such an embodiment is common in highly integrated systems such as cellular phones, watches, and other small area displays. In yet another embodiment, display array 30 is a typical display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some embodiments control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Various embodiments of an interferometric modulator display have been described. Nevertheless, one or ordinary skill in the art will readily recognize that various modifications may be made to the implementations, and any variation would be within the spirit and scope of the present invention. For example, process steps discussed above in connection with FIG. 11 may be performed in a different order and still achieve desirable results. Accordingly, many modifications may be made by one of ordinary skill in the art without departing from the spirit can scope of the following claims.

What is claimed is:

1. An interferometric modulator display pixel comprising:
   an electromechanical systems interferometric modulator having an associated first color spectrum indicating a reflectance of light at a first peak wavelength,
   wherein the electromechanical systems interferometric modulator is operable to shift the first color spectrum relative to a second color spectrum to control a visual brightness of the interferometric modulator while said interferometric modulator appears substantially the same color, the second color spectrum indicating absorption of light except at a second peak wavelength that is different from the first peak wavelength, and
   wherein the interferometric display pixel comprises a reflective display pixel.

2. The interferometric modular display pixel of claim 1, further comprising a color absorber, the second color spectrum being the color spectrum of the color absorber.

3. The interferometric modulator display pixel of claim 1, wherein the visual brightness of the interferometric modulator display pixel increases with greater overlap between the first color spectrum and the second color spectrum, and decreases with less overlap between the first color spectrum and the second color spectrum.

4. The interferometric modulator display pixel of claim 1, further comprising a light source.

5. The interferometric modulator display pixel of claim 1, wherein
   the interferometric modulator display pixel comprises a plurality of color space regions, each color space region having a corresponding color spectrum associated therewith; and
   the interferometric modulator display pixel further comprises a color absorber located substantially in front of each color space region, each color absorber having an associated color spectrum,
   wherein the electromechanical systems interferometric modulator is operable to shift the color spectrum of each color space region relative to a color spectrum of a corresponding color absorber to control a visual brightness of a color associated with each color space region.

6. The interferometric modulator display pixel of claim 5, wherein the plurality of color space regions comprises one or more of a red color space region, a green color space region, or a blue color space region.

7. The interferometric modulator display pixel of claim 2, wherein one or more light sources provides light at the second color spectrum associated with the color absorber.

8. The interferometric modulator display pixel of claim 7, wherein the one or more light sources comprise a narrow spectrum light source or a broad spectrum light source.

9. The interferometric modulator display pixel of claim 8, wherein the narrow spectrum light source comprises a laser or a light-emitting diode (LED).

10. The interferometric modulator display pixel of claim 8, wherein the broad spectrum light source comprises a mercury lamp or a carbon arc lamp.

11. The interferometric modulator display pixel of claim 1, wherein the electromechanical systems interferometric modulator comprises:
    a first electrode layer;
    a second electrode layer;
    a support structure which separates the first electrode layer from the second electrode layer; and
    a reflective surface movable between a first position and a second position, wherein movement of the reflective surface between the first position and the second position shifts the first color spectrum relative to the second color spectrum.

12. The interferometric modulator display pixel of claim 11 wherein the reflective surface is on a reflective layer coupled to the second electrode layer.

13. The interferometric modulator display pixel of claim 11 wherein the reflective surface is on the second electrode layer.

14. A display comprising the interferometric modulator display pixel of claim 1.

15. The display of claim 14, further comprising:
    a processor that is in electrical communication with the interferometric modulator display pixel, the processor being configured to process image data; and
    a memory device in electrical communication with the processor.

16. The display of claim 15, further comprising:
    a first controller configured to send at least one signal to the interferometric modulator display pixel; and
    a second controller configured to send at least a portion of the image data to the first controller.

17. The display of claim 15, further comprising an image source module configured to send the image data to the processor.

18. The display of claim 17, wherein the image source module comprises at least one of a receiver, transceiver, and transmitter.

19. The display of claim 15, further comprising an input device configured to receive input data and to communicate the input data to the processor.

20. An interferometric modulator display pixel comprising:
   means for interferometrically modulating light, said modulating means having an associated first color spectrum indicating a reflectance of light at a first peak wavelength; and
   a means for absorbing light and thereby producing a color, the light absorbing means having an associated second color spectrum indicating absorption of light except at a second peak wavelength that is different from the first peak wavelength,
   wherein the modulating means is operable to shift the first color spectrum relative to the second color spectrum to control a visual brightness of the modulating means independent of the color of the modulating means, and
   wherein the interferometric display pixel is configured as a reflective display pixel.

21. A method of manufacturing an interferometric modulator, the method comprising:
   providing a substrate;
   forming an optical stack on the substrate;
   forming a moveable reflective layer over the optical stack, said moveable reflective layer and said optical stack together having an associated first color spectrum indicating a reflectance of light at a first peak wavelength; and
   providing a color absorber, the color absorber absorbing light except light within a second range of wavelengths that is different from the first-peak wavelength,
   wherein said moveable reflector layer is operable to shift the first color spectrum relative to the second color spectrum to control visual brightness of the interferometric modulator such that said interferometric modulator provides multiple levels of brightness of a color, and
   wherein the interferometric modulator display is included in a reflective display pixel.

22. The method of claim 21, wherein the color absorber is formed on a surface of the substrate opposite of the optical stack.

23. The method of claim 21, wherein the color absorber is formed on a surface of the substrate on a same side as the optical stack.

24. The method of claim 21, wherein forming an optical stack on the substrate and forming a moveable reflective layer over the optical stack comprises:
   forming a first conductive layer on the substrate;
   depositing an oxide layer over the first conductive layer;
   depositing a sacrificial layer over the oxide layer;
   forming a plurality of first support posts to support a second conductive layer;
   forming the second conductive layer over the sacrificial layer and the plurality of first support posts; and
   etching away the sacrificial layer.

25. An interferometric modulator manufactured in accordance with the method of claim 21.

26. The interferometric modulator of claim 20, wherein the visual brightness of the interferometric modulator increases with greater overlap between the first color spectrum and the second color spectrum, and decreases with less overlap between the first color spectrum and the second color spectrum.

27. The interferometric modulator of claim 20, further comprising one or more light sources.

28. The interferometric modulator of claim 20, wherein
   the interferometric modulator comprises a plurality of color space regions, each color space region having a corresponding color spectrum associated therewith; and
   the interferometric modulator further comprises a color absorber located substantially in front of each color space region, each color absorber having an associated color spectrum,
   wherein the modulating means is operable to shift the color spectrum of each color space region relative to a color spectrum of a corresponding color absorber to control a visual brightness of a color associated with each color space region.

29. The interferometric modulator of claim 28, wherein the plurality of color space regions comprises one or more of a red color space region, a green color space region, or a blue color space region.

30. The interferometric modulator display pixel of claim 20, further comprising one or more light sources that provides illumination at the second peak wavelength associated with the light absorbing means.

31. The interferometric modulator of claim 20, wherein the modulating means comprises a micro electromechanical system.

32. The interferometric modulator of claim 20, wherein the modulating means comprises:
   a first electrode layer;
   a second electrode layer;
   a support that separates the first electrode layer from the second electrode layer; and
   a reflective surface movable between a first position and a second position, wherein movement of the reflective surface between the first position and the second position shifts the first color spectrum relative to the second color spectrum.

33. An interferometric modulator display pixel comprising:
   an electromechanical system interferometric modulator having an associated first color spectrum corresponding to reflectance of light, said first color spectrum having a first peak wavelength; and
   a color absorber, the color absorber having an associated second color spectrum corresponding to absorption of light, said second color spectrum comprising a second peak transmission wavelength having reduced absorption that is different from the first peak wavelength,
   wherein the electromechanical systems interferometric modulator is operable to shift the first color spectrum relative to the second color spectrum to control a visual brightness of the interferometric modulator such that said interferometric modulator is configured to provide multiple levels of brightness of color light, and
   wherein the interferometric display pixel comprises a reflective display pixel.

34. The interferometric modulator display pixel of claim 33, wherein the visual brightness of the interferometric modulator display pixel increases with greater overlap between the first color spectrum and the second color spectrum, and decreases with less overlap between the first color spectrum and the second color spectrum.

35. The interferometric modulator display pixel of claim 33, wherein
the interferometric modulator display pixel comprises a plurality of color space regions, each color space region having a corresponding color spectrum associated therewith; and
the interferometric modulator display pixel further comprises a color absorber located substantially in front of each color space region, each color absorber having an associated color spectrum,
wherein the electromechanical system interferometric modulator is operable to shift the color spectrum of each color space region relative to a color spectrum of a corresponding color absorber to control a visual brightness of a color associated with each color space region.

36. The interferometric modulator display pixel of claim 35, wherein the plurality of color space regions comprises one or more of a red color space region, a green color space region, or a blue color space region.

37. The interferometric modulator display pixel of claim 33, wherein one or more light sources provides light at the second peak transmission wavelength associated with the color absorber.

38. The interferometric modulator display pixel of claim 33, wherein the electromechanical system interferometric modulator comprises:
a first electrode layer;
a second electrode layer;
a support structure which separates the first electrode layer from the second electrode layer; and
a reflective surface movable between a first position and a second position, wherein movement of the reflective surface between the first position and the second position shifts the first color spectrum relative to the second color spectrum.

39. The display of claim 14, wherein the display is configured as a reflective display.

40. The interferometric modulator display pixel of claim 1, further comprising a controller configured to provide multiple levels of brightness control for the color output of the interferometric modulator by controlling the shift of the first color spectrum relative to the second color spectrum.

41. The interferometric modulator display pixel of claim 33, further comprising a controller configured to provide said multiple levels of brightness for the color light output by the interferometric modulator by controlling the shift of the first color spectrum relative to the second color spectrum.

42. A reflective display comprising the interferometric display pixel of claim 33.

43. The display of claim 39, wherein the reflective display is configured to produce an image by modulation of incident ambient light.

44. The display of claim 42, wherein the reflective display is configured to produce an image by modulation of incident ambient light.

45. A reflective display comprising the interferometric modulator display pixel of claim 20.

46. The display of claim 45, wherein the reflective display is configured to produce an image by modulation of incident ambient light.

47. A reflective display comprising the interferometric modulator of claim 25.

48. The display of claim 47, wherein the reflective display is configured to produce an image by modulation of incident ambient light.

49. A display pixel comprising:
a reflective electro-mechanical device comprising:
a substrate;
an optical stack disposed on a first side of the substrate, said optical stack comprising a first partially reflective layer; and
a second reflective layer disposed on said first side of the substrate, the reflective electro-mechanical device having an associated first color spectrum indicating a reflectance of light at a first peak wavelength; and
a color filter having an associated second color spectrum, said second color spectrum comprising a second peak transmission wavelength that is different from the first peak wavelength,
wherein ambient light incident from a second side of the substrate is interferometrically modulated by the reflective electro-mechanical device and is viewable from said second side of the substrate, and
wherein the reflective electro-mechanical device is operable to shift the first color spectrum relative to the second color spectrum to provide multiple levels of visual brightness of color light.

50. The display pixel of claim 49, wherein the visual brightness of the reflective electro-mechanical device increases with greater overlap between the first color spectrum and the second color spectrum, and decreases with less overlap between the first color spectrum and the second color spectrum.

51. The display pixel of claim 49, further comprising a light source.

52. The display pixel of claim 51, wherein one or more light sources provides light at the second color spectrum associated with the color filter.

53. The display pixel of claim 52, wherein the one or more light sources comprise a narrow spectrum light source or a broad spectrum light source.

54. The display pixel of claim 53, wherein the narrow spectrum light source comprises a laser or a light-emitting diode (LED).

55. The display pixel of claim 53, wherein the broad spectrum light source comprises a mercury lamp or a carbon arc lamp.

56. The display pixel of claim 49, wherein the second reflective layer is movable between a first position and a second position, wherein movement of the second reflective layer between the first position and the second position shifts the first color spectrum relative to the second color spectrum.

57. A display comprising the display pixel of claim 49.

58. The display of claim 57, wherein the display comprises a reflective display.

59. The display pixel of claim 49, further comprising a controller configured to provide multiple levels of brightness control for the color output of the reflective electro-mechanical device by controlling the shift of the first color spectrum relative to the second color spectrum.

60. The display pixel of claim 49, wherein the reflective electro-mechanical device is configured to produce an image by modulation of incident ambient light.

61. The display pixel of claim 60, further comprising a controller configured to control said reflective electro-mechanical device to provide multiple levels of visual brightness for the color light output by the reflective electro-mechanical device by controlling the shift of the first color spectrum relative to the second color spectrum so as to produce said image by modulation of incident ambient light.

* * * * *